US012725173B2

(12) United States Patent
Tami et al.

(10) Patent No.: US 12,725,173 B2
(45) Date of Patent: Sep. 1, 2026

(54) WATCH AUTHENTICITY INFORMATION PROCESSING SYSTEM

(71) Applicant: NHK SPRING CO., LTD., Yokohama (JP)

(72) Inventors: Kenichiro Tami, Yokohama (JP); Naomi Iida, Yokohama (JP); Jumpei Masumoto, Yokohama (JP)

(73) Assignee: NHK SPRING CO., LTD., Yokohama (JP)

(*) Notice: Subject to any disclaimer, the term of this patent is extended or adjusted under 35 U.S.C. 154(b) by 0 days.

(21) Appl. No.: 18/799,696

(22) Filed: Aug. 9, 2024

(65) Prior Publication Data

US 2024/0403897 A1 Dec. 5, 2024

Related U.S. Application Data

(63) Continuation of application No. PCT/JP2023/003995, filed on Feb. 7, 2023.

(30) Foreign Application Priority Data

Feb. 9, 2022 (JP) ................................ 2022-019067

(51) Int. Cl.
*G06Q 30/018* (2023.01)
*G06V 10/44* (2022.01)
(Continued)

(52) U.S. Cl.
CPC ......... *G06Q 30/0185* (2013.01); *G06V 10/44* (2022.01); *G06V 10/761* (2022.01); *G06V 10/764* (2022.01); *G06V 30/10* (2022.01)

(58) Field of Classification Search
CPC .............. G06Q 30/018–30/0185; G06V 30/10
See application file for complete search history.

(56) References Cited

U.S. PATENT DOCUMENTS

2002/0072948 A1 6/2002 Iguti et al.
2013/0200143 A1* 8/2013 Callegari ................ G04D 7/00 235/375

(Continued)

FOREIGN PATENT DOCUMENTS

CN 106233711 A 12/2016
CN 108154208 A 6/2018

(Continued)

OTHER PUBLICATIONS

Oucheikh et al., Product verification using OCR classification and Mondrian conformal prediction, Expert systems with applications 188, Feb. 2022, 115942 (Year: 2022).*

(Continued)

*Primary Examiner* — Daniel Vetter
(74) *Attorney, Agent, or Firm* — Hauptman Ham, LLP

(57) ABSTRACT

An information processing system includes an object group information acquisition section configured to acquire object group information regarding an object group to which an object belongs from a first image capturing a first side of the object, an object feature amount generation section configured to generate a feature amount of the object from a second image capturing a second side of the object, and an object identification information acquisition section configured to acquire object identification information for identifying the object based on the object group information and the feature amount.

6 Claims, 22 Drawing Sheets

(51) Int. Cl.

| | |
|---|---|
| ***G06V 10/74*** | (2022.01) |
| ***G06V 10/764*** | (2022.01) |
| ***G06V 30/10*** | (2022.01) |

(56) References Cited

U.S. PATENT DOCUMENTS

| | | | | |
|---|---|---|---|---|
| 2013/0231992 | A1 | 9/2013 | Sugasawa et al. | |
| 2014/0160904 | A1* | 6/2014 | Decoux | G04G 9/0041 368/226 |
| 2016/0300107 | A1 | 10/2016 | Callegari et al. | |
| 2017/0061622 | A1 | 3/2017 | Sakano et al. | |
| 2017/0287147 | A1 | 10/2017 | Takahashi et al. | |
| 2018/0144160 | A1* | 5/2018 | Shirakura | G06K 7/10 |
| 2020/0134312 | A1* | 4/2020 | Vandini | G06V 20/80 |
| 2020/0226366 | A1 | 7/2020 | Withrow et al. | |
| 2022/0051301 | A1* | 2/2022 | Forutanpour | G06V 10/235 |
| 2022/0130545 | A1 | 4/2022 | Wei | |
| 2022/0146983 | A1* | 5/2022 | Favre | G06F 16/635 |
| 2022/0164590 | A1* | 5/2022 | Knowles | G06T 7/20 |
| 2023/0082046 | A1 | 3/2023 | Isoda et al. | |

FOREIGN PATENT DOCUMENTS

| | | | |
|---|---|---|---|
| CN | 108256576 | A | 7/2018 |
| CN | 108520058 | A | 9/2018 |
| CN | 112349409 | A | 2/2021 |
| CN | 112507066 | A | 3/2021 |
| JP | 2001-265889 | A | 9/2001 |
| JP | 2013-214282 | A | 10/2013 |
| JP | 2014-44481 | A | 3/2014 |
| JP | 2014-215907 | A | 11/2014 |
| JP | 2017-10231 | A | 1/2017 |
| JP | 2019-117437 | A | 7/2019 |
| JP | 2020-16956 | A | 1/2020 |
| JP | 2020-161149 | A | 10/2020 |
| JP | 2021-125222 | A | 8/2021 |
| JP | 2021-128696 | A | 9/2021 |
| TW | M622370 | U | 1/2022 |
| WO | 2016/077934 | A1 | 5/2016 |

OTHER PUBLICATIONS

English Translation of Written Opinion of the International Searching Authority issued on Apr. 25, 2023 for corresponding International Patent Application No. PCT/JP2023/003995 (5 pages).

International Search Report issued on Apr. 25, 2023 for corresponding International Patent Application No. PCT/JP2023/003995, along with an English translation (4 pages).

Written Opinion issued on Apr. 25, 2023 for corresponding International Patent Application No. PCT/JP2023/003995 (5 pages).

Notice of Reasons for Refusal dated on Mar. 15, 2022 for corresponding Japanese Patent Application No. 2022-019067, along with an English machine translation (79 pages).

Notice of Reasons for Refusal dated Jul. 26, 2022 for corresponding Japanese Patent Application No. 2022-019067, along with an English machine translation (4 pages).

Decision to Grant a Patent dated Aug. 23, 2022 for corresponding Japanese Patent Application No. 2022-019067, along with an English machine translation (5 pages).

Notice of Reasons for Refusal dated Aug. 22, 2023 for corresponding Japanese Patent Application No. 2022-150131, along with an English machine translation (10 pages).

Decision to Grant a Patent dated Oct. 31, 2023 for corresponding Japanese Patent Application No. 2022-150131, along with an English machine translation (6 pages).

Taiwan Office Action issued on Jul. 25, 2025, for corresponding Taiwan Patent Application No. 111105488, with its English machine translation, 20 pages.

Office Action issued on Dec. 22, 2025 for corresponding Taiwanese Patent Application No. 111105488, along with an English machine translation (21 pages).

The Extended European Search Report issued on Jan. 15, 2026 for corresponding European Patent Application No. 23752864.1 (8 pages).

Office Action issued on May 29, 2026 for corresponding Taiwanese Patent Application No. 111105488, along with an English machine translation (26 pages).

* cited by examiner

FIG.10

| | ABC-10-DE-1 | ABC-10-DE-2 | ABC-10-DE-3 | ... |
|---|---|---|---|---|
| color of dial | white | white | pink | ... |
| color of bezel | silver | black | silver | ... |
| shape of index | Roman numerals | Roman numerals | Arabic numerals | ... |
| ⋮ | ⋮ | ⋮ | ⋮ | |

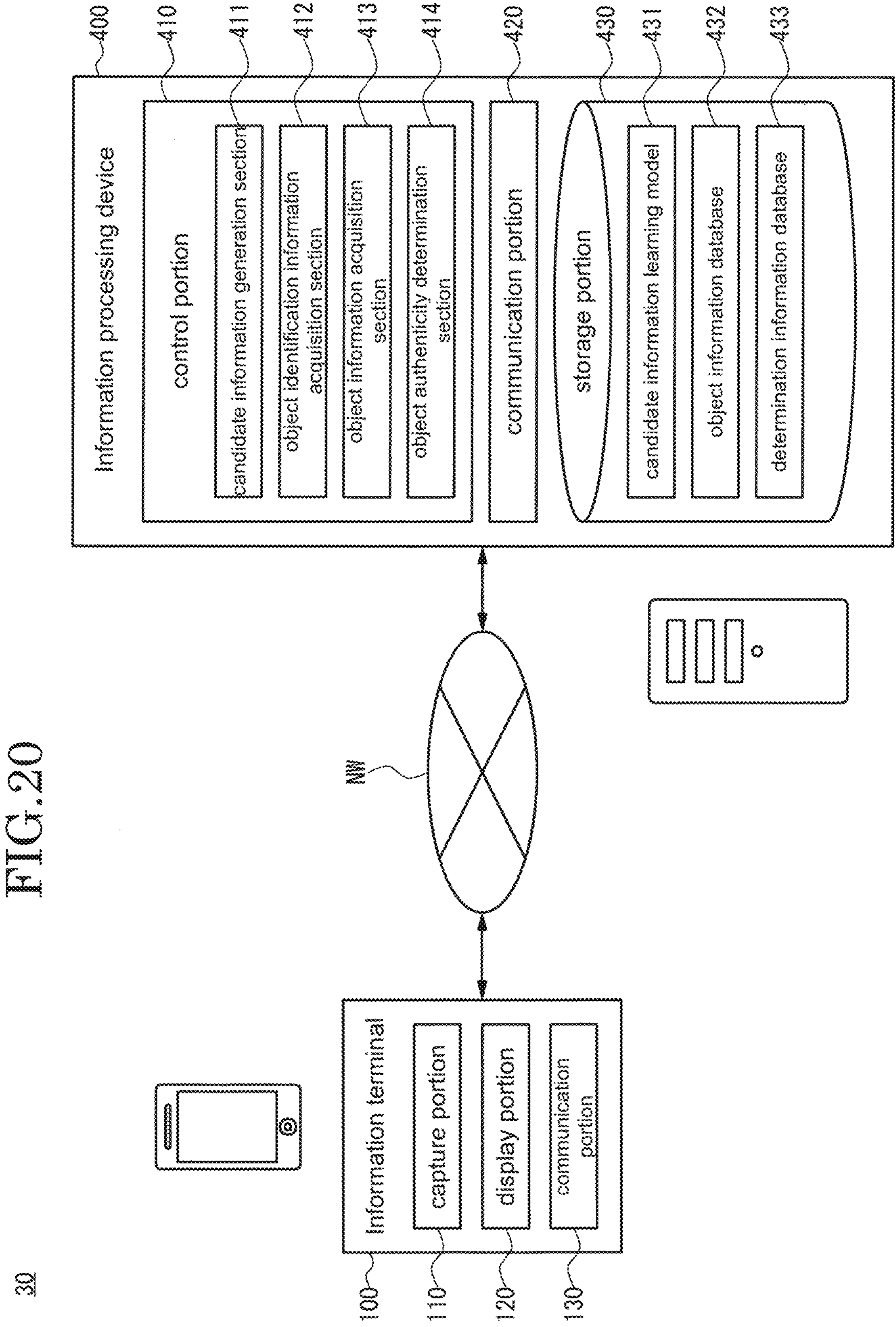
FIG.20
30
Information processing device
control portion
candidate information generation section
object identification information acquisition section
object information acquisition section
object authenticity determination section
communication portion
storage portion
candidate information learning model
object information database
determination information database
400
410
411
412
413
414
420
430
431
432
433
NW
Information terminal
capture portion
display portion
communication portion
100
110
120
130

WATCH AUTHENTICITY INFORMATION PROCESSING SYSTEM

CROSS-REFERENCE TO RELATED APPLICATIONS

This application is a Continuation of International Patent Application No. PCT/JP2023/003995, filed on Feb. 7, 2023, which claims the benefit of priority to Japanese Patent Application No. 2022-019067, filed on Feb. 9, 2022, the entire contents of which are incorporated herein by reference.

FIELD

An embodiment of the present invention relates to an information processing system for determining object identification information for identifying an object. Further, an embodiment of the present invention relates to an information processing method for determining object identification for identifying an object.

BACKGROUND

A product number (or a model number) is assigned to a product as the official name of the product. For example, even when two watches have the same appearance, each watch is assigned with a different product number in the case where the colors of the dials of the two watches are different. In general, a character string that combines a series name (or a product name) indicating the type of products and characters indicating the differences in parts in the same series is used as the product number. Since the product number is mainly used as identification information for a manufacturer to manage the products, a user who owns the product often know the series name of the product but not the product number of the product. In addition, since the product number is identification information assigned to multiple identical products regardless of the individual product, an authenticity determination method in which the product number in an image of a product is used as a reference part is known (for example, see Japanese Patent Application Laid-Open No. 2020-161149).

SUMMARY

An information processing system according to an embodiment of the present invention includes an object group information acquisition section configured to acquire object group information regarding an object group to which an object belongs from a first image capturing a first side of the object, an object feature amount generation section configured to generate a feature amount of the object from a second image capturing a second side of the object, and an object identification information acquisition section configured to acquire object identification information for identifying the object based on the object group information and the feature amount.

The object group information acquisition section may extract a character string included in the first image, and acquire the object group information associated with the extracted character string.

The object feature amount generation section may generate the feature amount of a part of the object included in the second image based on part information associated with the object group information.

The information processing system may further include an object authenticity determination section configured to acquire manufacturing identification information that is assigned to the object at a time of manufacturing the object from the first image and to perform an authenticity determination of the object based on the manufacturing identification information.

Further, an information processing system according to an embodiment of the present invention includes a manufacturing identification information acquisition section configured to acquire manufacturing identification information that is assigned to the object at a time of manufacturing the object from a first image capturing a first side of the object, and an object identification information acquisition section configured to acquire object identification information for identifying the object based on the manufacturing identification information.

The manufacturing identification information acquisition section may extract a character string included in the first image and acquire the manufacturing identification information.

The information processing system may further include an object feature amount generation section configured to generate a feature amount of the object from a second image capturing a second side of the object. The object identification information acquisition section may acquire the object identification information based on the manufacturing identification information and the feature amount.

The information processing system may further include an object authenticity determination section configured to perform an authenticity determination of the object based on the manufacturing identification information.

Furthermore, an information processing system according to an embodiment of the present invention includes a candidate information generation section configured to generate a feature amount of an object based on a second image capturing a second side of the object and to generate candidate information for object identification information for identifying the object based on the generated feature amount, and an object identification information acquisition section configured to acquire the object identification information based on first user input information by a user to whom the candidate information is provided.

The candidate information generation section may generate the candidate information using a candidate information learning model that is trained to output the candidate information when the second image is input.

The information processing system may further include an object authenticity determination section configured to acquire manufacturing identification information that is assigned to the object at a time of manufacturing the object based on second user input information by the user and to perform an authenticity determination of the object based on the manufacturing identification information. Moreover, the information processing system may further include an object authenticity determination section configured to acquire manufacturing identification information that is assigned to the object at a time of manufacturing the object from a first image capturing a first side of the object and to perform an authenticity determination of the object based on the manufacturing identification information.

The object authenticity determination section may perform the authenticity determination of the object based on a number of times the manufacturing identification information is determined.

The information processing system may further include an object information acquisition section configured to acquire object information regarding the object based on the object identification information.

An information processing method according to an embodiment of the present invention includes the steps of acquiring object group information regarding an object group to which an object belongs from a first image capturing a first side of the object, generating a feature amount of the object from a second image capturing a second side of the object, and acquiring object identification information for identifying the object based on the object group information and the feature amount.

The object group information may be acquired by extracting a character string included in the first image.

The feature amount is a feature amount of a part of the object included in the second image based on part information associated with the object group information.

The information processing method may further include the steps of acquiring manufacturing identification information that is assigned to the object at a time of manufacturing the object from the first image and performing an authenticity determination of the object based on the manufacturing identification information.

Further, an information processing method according to an embodiment of the present invention includes the steps of acquiring manufacturing identification information that is assigned to the object at a time of manufacturing the object from a first image capturing a first side of the object and acquiring object identification information for identifying the object based on the manufacturing identification information.

The manufacturing identification information may be acquired by extracting a character string included in the first image.

The information processing system may further include a step of generating a feature amount of the object from a second image capturing a second side of the object. The object identification information may be acquired based on the manufacturing identification information and the feature amount.

The information processing method may further include a step of determining an authenticity of the object based on the manufacturing identification information.

Furthermore, an information processing method according to an embodiment of the present invention includes the steps of generating a feature amount of an object based on a second image capturing a second side of the object, generating candidate information for object identification information for identifying the object based on the generated feature amount, and acquiring the object identification information based on first user input information by a user to whom the candidate information is provided.

The candidate information may be generated using a candidate information learning model that is trained to output the candidate information when the second image is input.

The information processing method may further include the steps of acquiring manufacturing identification information that is assigned to the object at a time of manufacturing the object based on second user input information by the user and determining an authenticity of the object based on the manufacturing identification information. Moreover, the information processing method may further include the steps of acquiring manufacturing identification information that is assigned to the object at a time of manufacturing the object from a first image capturing a first side of the object and performing an authenticity determination of the object based on the manufacturing identification information.

The authenticity of the object is determined based on a number of times the manufacturing identification information is determined.

The information processing method may further include a step of acquiring object information regarding the object based on the object identification information.

A program according to an embodiment of the present invention is executed on a computer of an information terminal. The program includes the steps of acquiring object group information regarding an object group to which an object belongs from a first image capturing a first side of the object, generating a feature amount of the object from a second image capturing a second side of the object, and acquiring object identification information for identifying the object based on the object group information and the feature amount.

The program may further include the steps of acquiring manufacturing identification information that is assigned to the object at a time of manufacturing the object from the first image and performing an authenticity determination of the object based on the manufacturing identification information.

Further, a program according to an embodiment of the present invention is executed on a computer of an information terminal. The program includes the steps of acquiring manufacturing identification information that is assigned to the object at a time of manufacturing the object from a first image capturing a first side of the object and acquiring object identification information for identifying the object based on the manufacturing identification information.

The program may further include a step of generating a feature amount of the object from a second image capturing a second side of the object. The object identification information may be acquired based on the manufacturing identification information and the feature amount.

The program may further include a step of determining an authenticity of the object based on the manufacturing identification information.

Furthermore, a program according to an embodiment of the present invention is executed on a computer of an information terminal. The program includes the steps of generating a feature amount of an object based on a second image capturing a second side of the object, generating candidate information for object identification information for identifying the object based on the generated feature amount, and acquiring the object identification information based on first user input information by a user to whom the candidate information is provided.

The program may further include the steps of acquiring manufacturing identification information that is assigned to the object at a time of manufacturing the object based on second user input information by the user and performing an authenticity determination of the object based on the manufacturing identification information. Moreover, the program may further include the steps of acquiring manufacturing identification information that is assigned to the object at a time of manufacturing the object from a first image capturing a first side of the object and performing an authenticity determination of the object based on the manufacturing identification information.

The object may be a watch.

BRIEF DESCRIPTION OF DRAWINGS

FIG. 10 is a schematic diagram for explaining an object identification information database used in an object identification information determination process executed in an information processing system according to an embodiment of the present invention (First Embodiment).

FIG. 20 is a block diagram showing a configuration of an information processing system according to an embodiment of the present invention (Third Embodiment).

DESCRIPTION OF EMBODIMENTS

Figure 1:
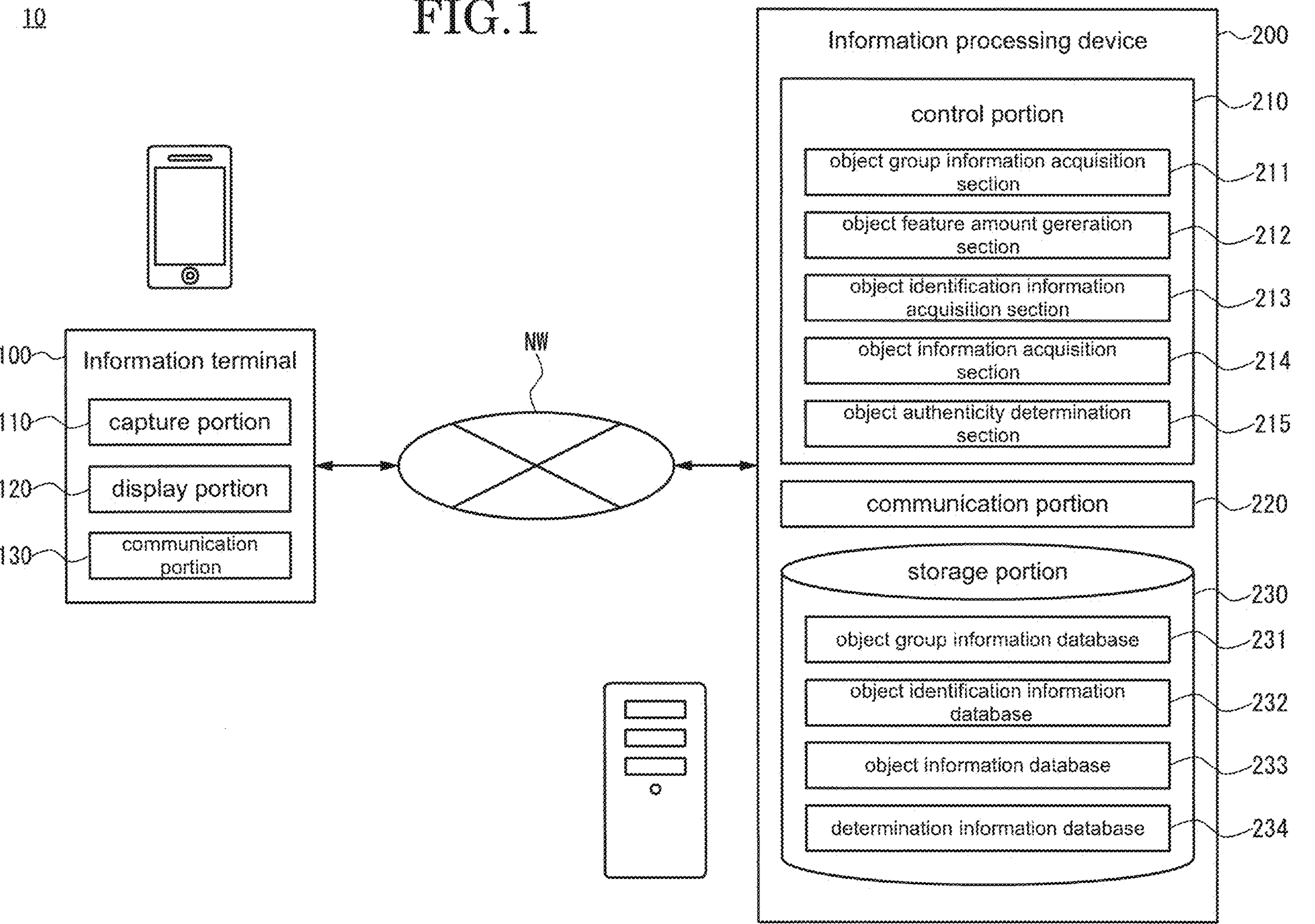
FIG. 1 is a block diagram showing a configuration of an information processing system according to an embodiment of the present invention (First Embodiment).

When an object purchased by a user breaks down and a part of the object requires replacing, the product number may be required in order to identify the part. However, when the object is small, only the series name, which is a part of the product number, may be attached to the object. Further, only the series name may be attached to the object from the viewpoint of the design of the object. In such cases, not only can the product number not be visually confirmed by the user but the product number cannot be acquired from an image capturing the object.

In view of the above problems, an embodiment of the present invention can provide an information processing system for determining object identification information for identifying an object. Further, an embodiment of the present invention can provide an information processing method for determining object identification information for identifying an object.

In an information processing system according to an embodiment of the present invention, it is possible to determine object identification information for identifying an object from an image capturing the object. Thus, the information processing system can provide information related to the object to a user or perform an authenticity determination of the object based on the determined object identification. Therefore, the user can easily confirm the maintenance deadline or the availability of repair parts in stock for the object owned by the user using the information processing system. In recent years, many objects are sold on EC sites, making it difficult for manufacturers to directly acquire user information. However, when the information processing system is used, it is possible for the manufacturers to acquire the user information. Further, since the manufacturers can provide information desired by the user through the information processing system, the user's satisfaction with the object can be improved.

In the following description, each embodiment of the present invention is described with reference to the drawings. However, the present invention can be implemented in various configurations without departing from the gist thereof, and should not be construed as being limited to the descriptions of the embodiments exemplified below.

For the sake of clarity of the description, although the drawings may be schematically represented with respect to the widths, thicknesses, shapes, and the like of the respective portions in comparison with actual embodiments, the drawings are merely examples and are not intended to limit the interpretation of the present invention. Further, in the present specification and each figure, elements having the same functions as those described for the previously mentioned figures may be designated by the same reference numerals, and duplicate explanations may be omitted.

In the specification and the drawings, the same reference numerals or the same reference numerals with an upper-case letter of the alphabet may be used when multiple configurations are identical or similar. Further, the same reference numeral with a hyphen and natural numbers may be used when multiple portions of one configuration are distinguished.

In the specification, terms such as “first”, “second”, or “third” attached to each configuration are convenient terms used to distinguish each configuration, and have no further meaning unless otherwise explained.

First Embodiment

An information processing system 10 according to an embodiment of the present invention is described with reference to FIGS. 1 to 12.

[1. Configuration of Information Processing System 10]

FIG. 1 is a block diagram showing a configuration of the information processing system 10 according to an embodiment of the present invention.

As shown in FIG. 1, the information processing system 10 includes an information terminal 100 and an information processing device 200. The information terminal 100 is communicably connected to the information processing device 200 via a network NW. The network may NW be wired or wireless. For example, although the network NW is a local area network (LAN) or the Internet, the network NW is not limited thereto.

The information terminal 100 is a terminal capable of capturing an image of an object, transmitting the image of the object, or receiving information regarding information processing executed in the information processing device 200. For example, although the information terminal 100 is a mobile phone, a smartphone, a tablet, or a personal computer, the information terminal 100 is not limited thereto.

The information terminal 100 includes a capture portion 110, a display portion 120, and a communication portion 130.

The capture portion 110 is an imaging device capable of photographing an object and generating an image of the photographed object. For example, a camera, a video, a scanner, or the like can be used for the capture portion 110.

The display portion 120 is a display interface including a screen and is capable of displaying an image or information on the screen. For example, a liquid crystal display device or an OLED display device can be used for the display portion 120.

The communication portion 130 is a communication interface capable of transmitting or receiving data or information by wire or wirelessly. For example, a LAN module or a Wi-Fi (registered trademark) module can be used for the communication portion 130.

The information processing device 200 is a computer capable of receiving an image from the information terminal 100 and executing information processing such as an object identification information determination process, an object information provision process, or an object authenticity determination process. The information processing device 200 may be one computer or multiple computers. The information processing device 200 may be a server. In addition, details of the object identification information determination process, the object information provision process, and the object authenticity determination process are described later.

The information processing device 200 includes a control portion 210, a communication portion 220, and a storage portion 230.

The control portion 210 can execute arithmetic processing using data or information. For example, the control portion 210 includes a central processing unit (CPU), a micro processing unit (MPU), a graphics processing unit (GPU), or a random access memory (RAM). Specifically, when the control portion 210 executes a program, an object group information acquisition section 211, an object feature amount generation section 212, an object identification information acquisition section 213, an object information acquisition section 214, and an object authenticity determination section 215 can be made to function.

The object group information acquisition section 211 can acquire object group information based on a character string in an image.

The object feature amount generation section 212 can generate a feature amount of an object in an image.

The object identification information acquisition section 213 can acquire object identification information based on the acquired object group information and the generated feature amount.

The object information acquisition section 214 can acquire object information associated with the object identification information.

The object authenticity determination section 215 can acquire manufacturing identification information in an image, perform an authenticity determination of an object based on the manufacturing identification information, and generate authenticity determination information.

Here, the object identification information, the object group information, the object information, and the manufacturing identification information are described.

The object identification information is information assigned to the object to distinguish the type of object. For example, the object identification information is a product number or a model number. The object group information is information indicating an object group into which the object is classified. For example, the object group information is a series name or a product name. The object identification information may include the object group information. For example, the object identification information may be “ABC-10-DE-1” which combines the object group information “ABC-10” with the characters “DE-1” indicating the characteristics of a part of the object in the object group.

The object information is any information related to the object. For example, the object information is information regarding parts or accessories of the object, instruction manuals, FAQs, user registration information, information regarding repairs or support, or advertisements related to the product (e.g., information regarding new products).

The manufacturing identification information is information that is assigned to the object at the time of manufacturing the object. For example, the manufacturing identification information is a serial number or a random number. That is, the manufacturing identification information is information that is attached to an individual object.

The communication portion 220 is a similar communication interface to the communication portion 130.

The storage portion 230 is a storage capable of storing data or information. Specifically, the storage portion 230 includes an object group information database 231, an object identification information database 232, an object information database 233, and a determination information database 234. For example, a hard disk drive (HDD), a solid state drive (SSD), a read only memory (ROM), a random access memory (RAM), or a flash memory can be used for the storage portion 230.

The object group information database 231 is a database in which a predetermined character string is associated with the object group. Therefore, it is possible to determine the object group based on the predetermined character string by using the object group information database 231. In addition, the number of predetermined character strings associated with the object group may be one or more.

The object identification information database 232 is a database in which a feature amount of the object is associated with the object identification information. Therefore, it is possible to determine the object identification information based on the feature amount of the object by using the object identification information database 232.

The object information database 233 is a database in which object identification information is associated with the object information. Therefore, it is possible to acquire the object information based on the object identification information by using the object information database 233.

The determination information database 234 is a database in which manufacturing identification information of an object is registered. Therefore, it is possible to perform an authenticity determination of the object based on whether or not the manufacturing identification information is registered using the determination information database 234. Further, the determination information database 234 may include items related to conditions for the authenticity determination associated with the manufacturing identification information (e.g., the number of times the authenticity determination is performed, etc.). In this case, it is possible to perform the authenticity determination of the object to which the manufacturing identification information is attached based on the conditions included in the items by using the determination information database 234.

In addition, the object identification information determination process, the object information provision process, and the object authenticity determination process can also be executed using a cloud computing method or an ASP (Application Service Provider) method in the information processing system 10.

Although the configuration of the information processing system 10 is described above, the information processing device 200 can execute information processing such as the object identification information determination process, the object information provision process, and the object authenticity determination process based on the image captured by the user's information terminal 100 in the information processing system 10. Even when the user does not know the object identification information, the object identification information can be determined by the object identification information determination process. Therefore, the information processing system 10 can provide the object information to the user or perform the authenticity determination of the object based on the determined object identification information. In the following description, the information processing executed by the information processing system 10 is described in detail.

[2. Information Processing Executed in Information Processing System 10]

[2-1. Configuration of Watch 500]

Before the information processing executed in the information processing system 10 is described, a watch 500 is described as an example of an object used in the information processing system 10. That is, the information processing system 10 can determine identification information of the watch 500 (object identification information) by executing the object identification information determination process. Further, the information processing system 10 can provide the user with information related to the watch 500 (object information) by executing the object information provision process. Furthermore, the information processing system 10 can perform an authenticity determination of the watch 500 by executing the object authenticity determination process.

Figure 2:
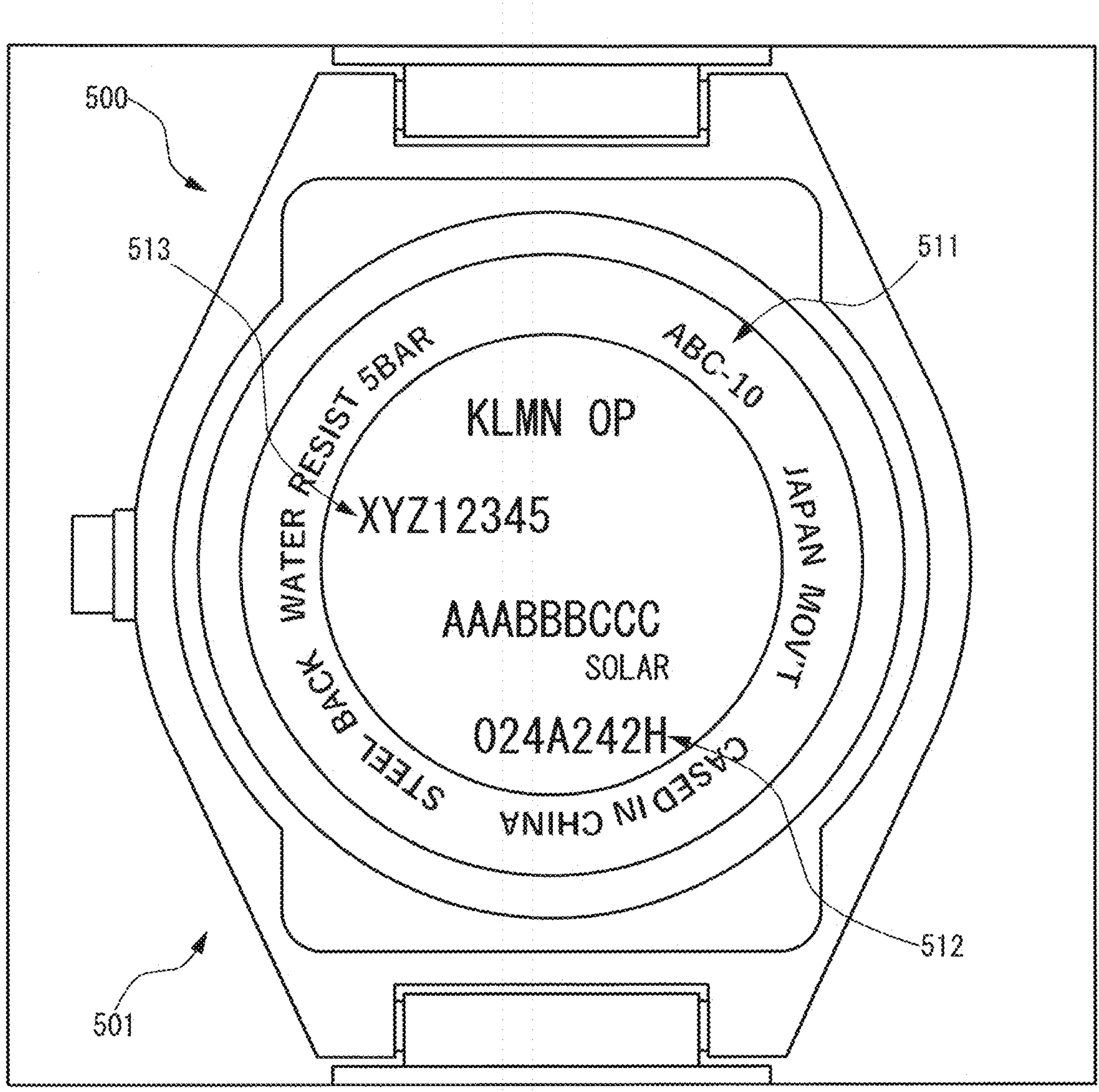
FIG. 2 is a schematic diagram of an image of a clock captured by an information processing system according to an embodiment of the present invention (First Embodiment).
Figure 3:
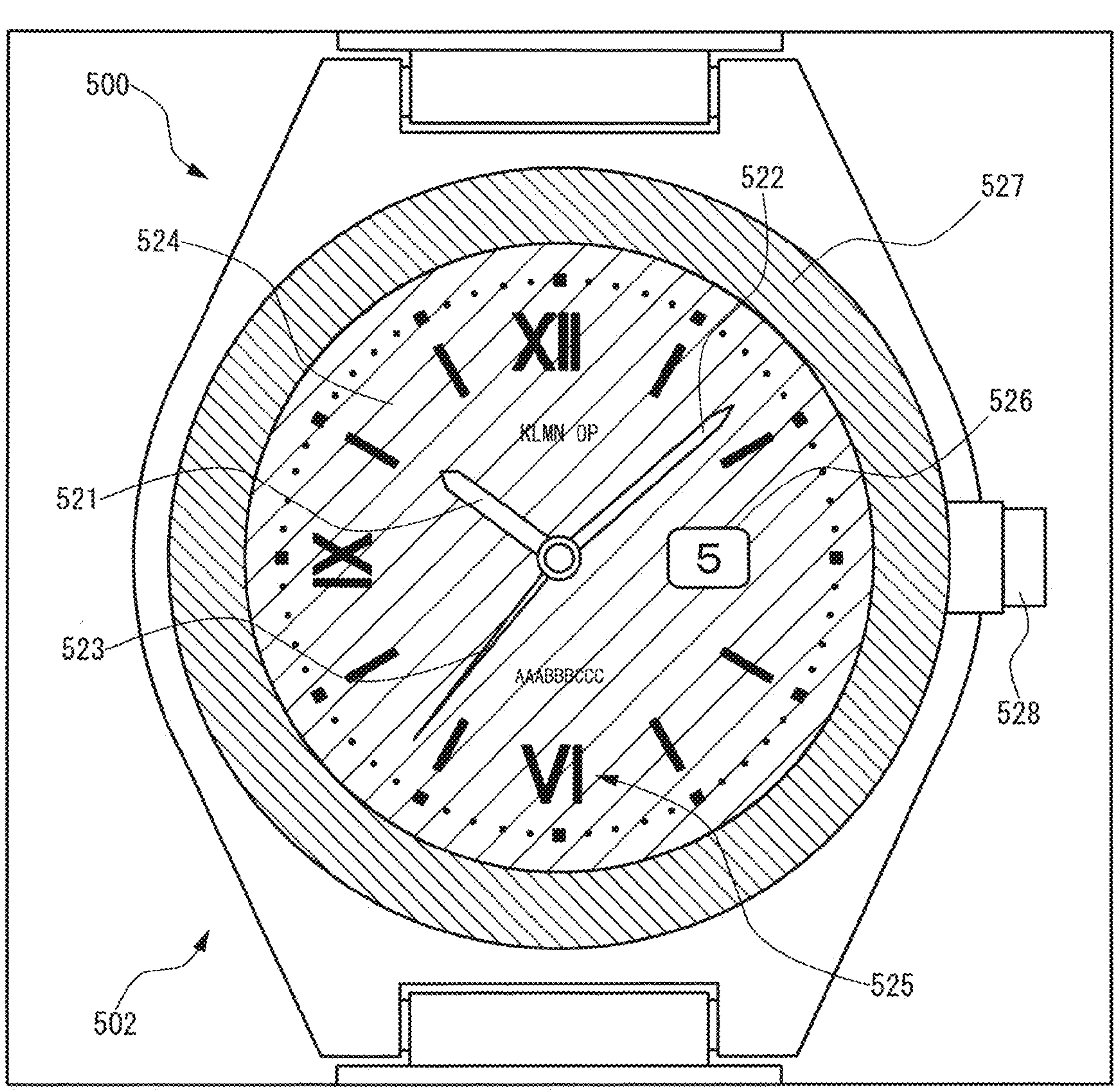
FIG. 3 is a schematic diagram of an image of a clock captured by an information processing system according to an embodiment of the present invention (First Embodiment).

Each of FIGS. 2 and 3 is a schematic diagram of an image of the watch 500 captured by the information processing system 10 according to an embodiment of the present invention. Specifically, FIG. 2 is a schematic diagram of a first image 510 captured by capturing a first side 501 of the watch 500, and FIG. 3 is a schematic diagram of a second image 520 captured by capturing a second side 502 of the watch 500. The second side 502 is the side opposite to the first side 501.

As shown in FIG. 2, the product number "ABC-10" as object group information 511, and character strings of the serial number "024A242H" and the random number "XYZ12345" as manufacturing identification information 512 are attached to the first side 501 of the watch 500. Further, character strings of the manufacturer's name "KLMN OP", the product name "AAABBBCCC", "SOLAR", "JAPAN MOV'T", "CASED IN CHINA", "STEEL BACK", and "WATER RESIST 5BAR" are attached to the first side 501 of the watch 500.

Further, as shown in FIG. 3, the second side 502 of the watch 500 is provided with parts such as an hour hand 521, a minute hand 522, a second hand 523, a dial 524, indexes 525, a calendar 526, a bezel 527, and a crown 528.

In the information processing system 10, the information processing can be executed based on the character strings attached to the watch 500 and the parts provided on the watch 500. In addition, although the information processing using watch 500 is described in the following description to facilitate understanding of the present embodiment, the object used in the information processing system 10 is not limited to the watch 500. Any object may be used as long as it has object group information attached to a first side and parts provided on a second side.

[2-2. Flow of Information Processing]

Figure 4:
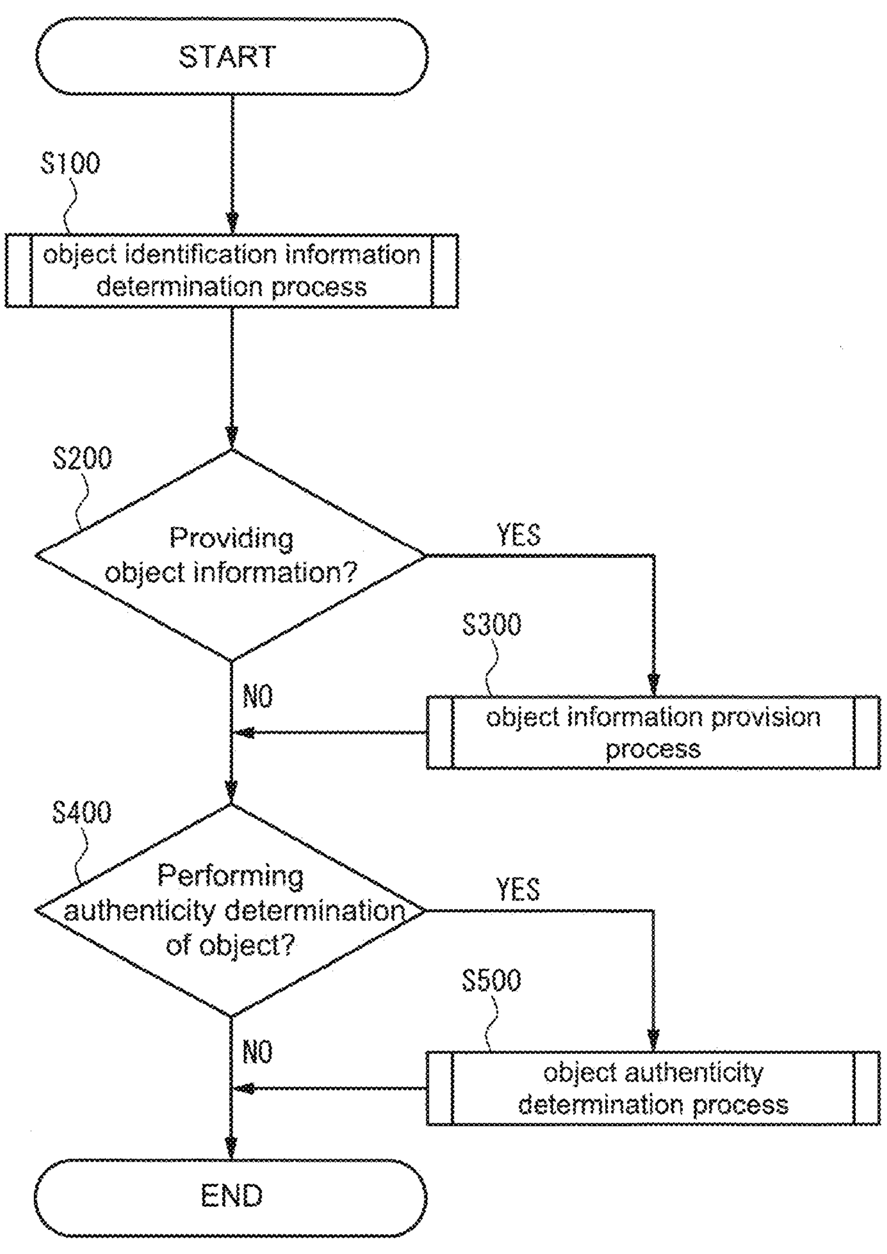
FIG. 4 is a flowchart of information processing executed in an information processing system according to an embodiment of the present invention (First Embodiment).

FIG. 4 is a flowchart of the information processing executed in the information processing system 10 according to an embodiment of the present invention. The information processing executed in the information processing system 10 is started by executing a program on the information terminal 100, and includes steps S100 to S500 as shown in FIG. 4.

In step S100, the object identification information determination process is executed. Although details of the object identification information determination process (step S100) are described later, the object identification information of the watch 500 can be determined by executing the object identification information determination process. The communication portion 220 may transmit the determined object identification information to the information terminal 100. In this case, in the information terminal 100, the object identification information received by the communication portion 130 is displayed on the screen of the display portion 120, and it can be notified to the user of the information terminal 100.

In step S200, it is determined whether or not to provide the user with the object information of the watch 500 based on the determined object identification information. For example, the user can operate the information terminal 100 to select whether or not to receive the object information of the watch 500. In this case, a user request regarding whether or not to provide the object information is transmitted from the information terminal 100, and the information processing device 200 determines whether or not to provide the object information of the watch 500 based on the user request. When the object information is provided (step S200: YES), step S300 is executed. When the object information is not provided (step S200: NO), step S400 is executed.

In step S300, the object information provision process is executed. Although details of the object information provision process (step S300) are described later, the object information of the watch 500 can be provided to the user by executing the object information provision process.

In step S400, it is determined whether or not to perform the authenticity determination of the watch 500. For example, the user can operate the information terminal 100 to select whether or not to perform the authenticity determination of the watch 500. In this case, a user request regarding whether or not to perform authenticity determination is transmitted from the information terminal 100, and the information processing device 200 determines whether or not to perform the authenticity determination of the watch 500 based on the user request. When the authenticity determination is performed (step S400: YES), step S500 is executed. When the authenticity determination is not performed (step S400: NO), the information processing ends.

In step S500, the object authenticity determination process is executed. Although details of the object authenticity determination process (step S500) are described later, the authenticity determination of the watch 500 can be performed by executing the object authenticity determination process.

In addition, the flow of the information processing executed by the information processing system 10 is not limited to the above-described steps. For example, the information processing may end without executing step S400 after the object information provision process (step S300) is executed.

Next, the object identification information determination process (step S100), the object information provision process (step S300), and the object authenticity determination process (step S500) are described in detail.

[2-2-1. Object Identification Information Determination Process (Step S100)]

Figure 5:
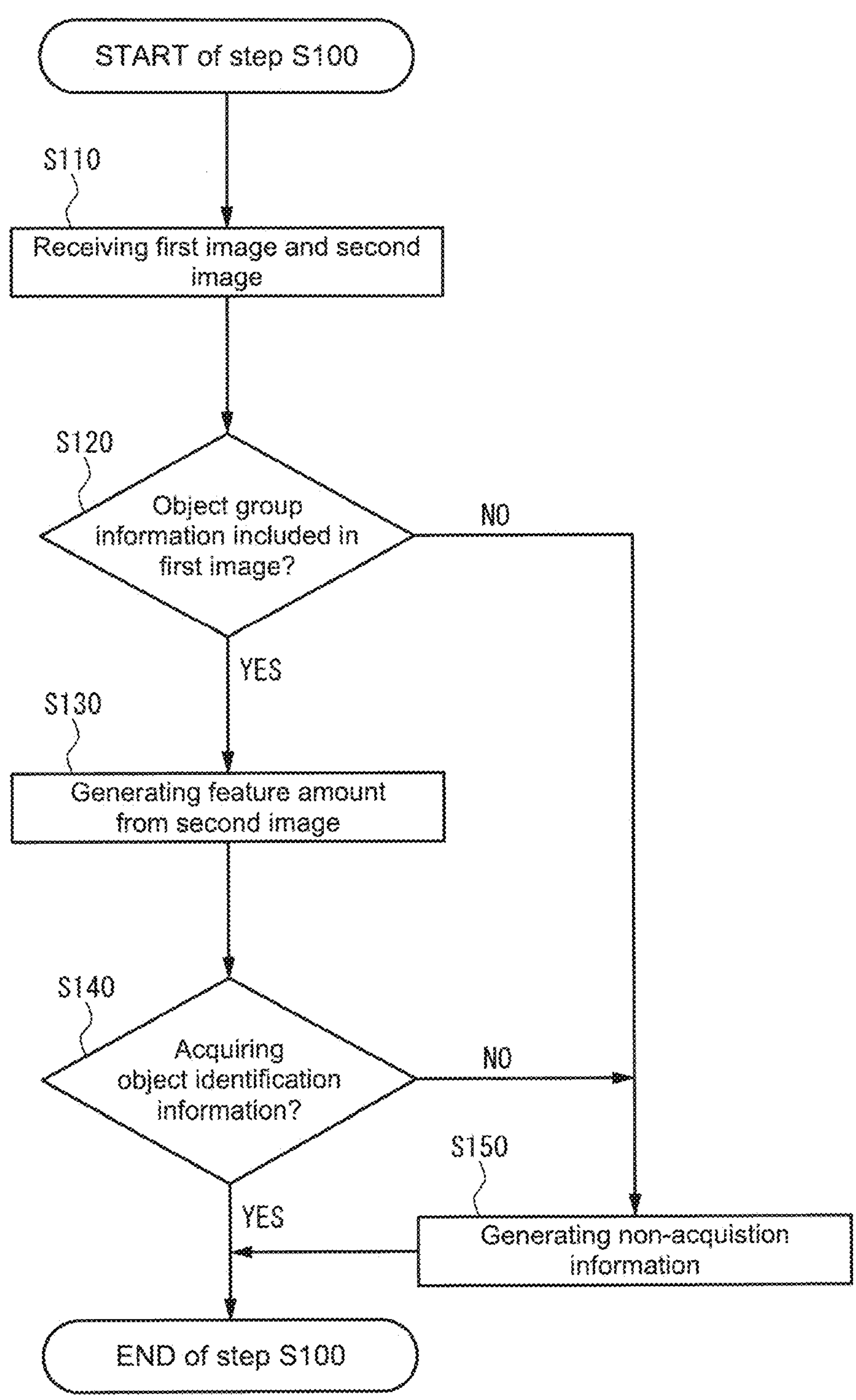
FIG. 5 is a flowchart of an object identification information determination process executed in an information processing system according to an embodiment of the present invention (First Embodiment).

FIG. 5 is a flowchart of the object identification information determination process executed in the information processing system 10 according to an embodiment of the present invention. As shown in FIG. 5, the object identification information determination process (step S100) includes steps S110 to S150.

In step S110, the communication portion 220 of the information processing device 200 receives the first image 510 and the second image 520 captured by the capture portion 110 of the information terminal 100. Thus, image processing of the first image 510 and the second image 520 (including correction of the resolution, size, and orientation of the first image 510 and the second image 520. During the correction of the size and the orientation, the parts, the overlapping position of the two hands, the center position of the dial, the time, a logo, or a character may be detected and correction may be performed based on these.) can be performed in the information processing device 200. In addition, the first image 510 and the second image 520 may be received at the same time. The second image 520 may be received after receiving the first image 510. Further, the second image 520 may be received after other steps are executed. In other words, the user can appropriately photograph the first side 501 or the second side 502 of the watch 500.

Here, photographing the watch 500 by the user is described with reference to FIG. 6.

Figure 6:
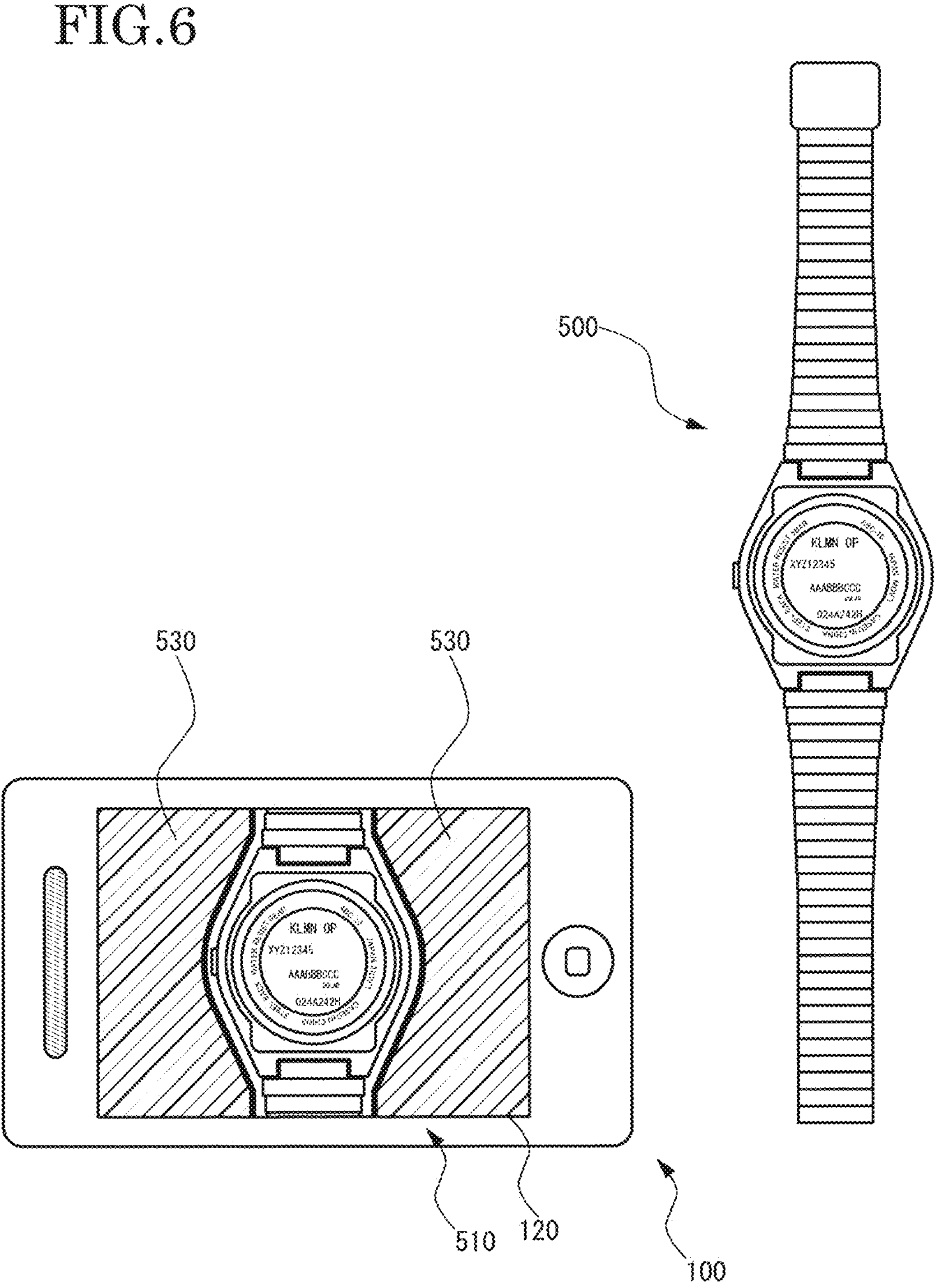
FIG. 6 is a schematic diagram for explaining a situation of a user photographing in an object identification information determination process executed in an information processing system according to an embodiment of the present invention (First Embodiment).

FIG. 6 is a schematic diagram for explaining a situation of the user photographing in the object identification and determination process executed in the information processing system 10 according to an embodiment of the present invention. As shown in FIG. 6, an image 530 in which a mask area along the outline of the watch 500 is shown is displayed on the screen of the display portion 120 of the information terminal 100 when the watch 500 is photographed. A photographing image is not displayed in the mask area of the image 530. Therefore, the user can photograph the watch 500 while adjusting the position and angle of the information terminal 100 and the watch 500 so as not to overlap the mask area. Further, when the image 530 is displayed, the user tries to photograph the watch 500 along the edge of the mask area of the image 530, so that the size of the watch 500 in the first image 510 is adjusted to be constant. The above-described configuration can be applied not only to the first image 510 but also to the second image 520.

In addition, the method for photographing the watch 500 using the information terminal 100 is not limited to the method shown in FIG. 6. Other methods for photographing the watch 500 are described with reference to FIGS. 7 to 9.

Figure 7:
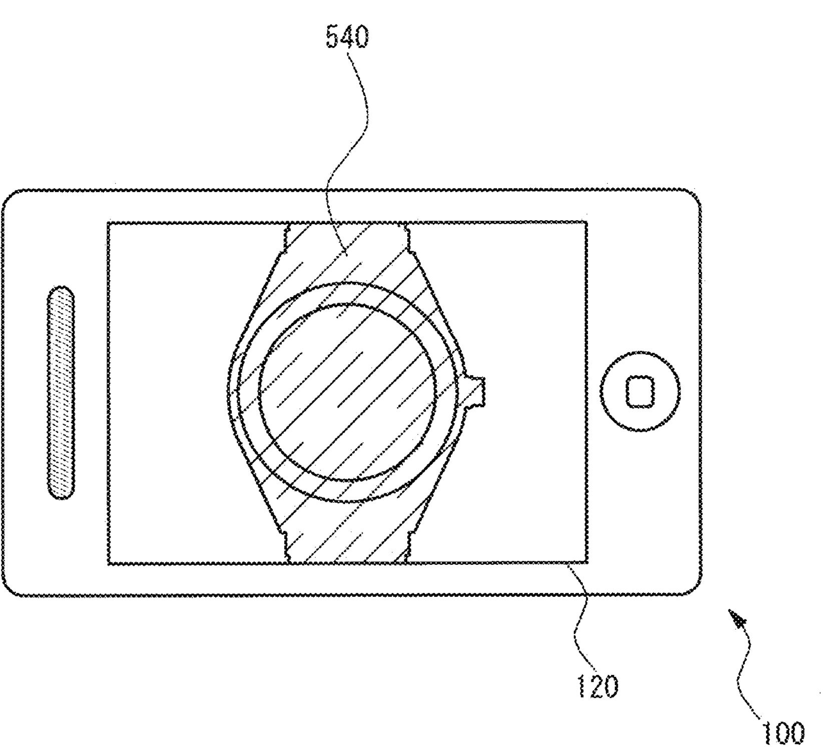
FIG. 7 is a schematic diagram for explaining an image displayed on a screen of a display portion of an information terminal in an object identification information determination process executed in an information processing system according to an embodiment of the present invention (First Embodiment).
Figure 8:
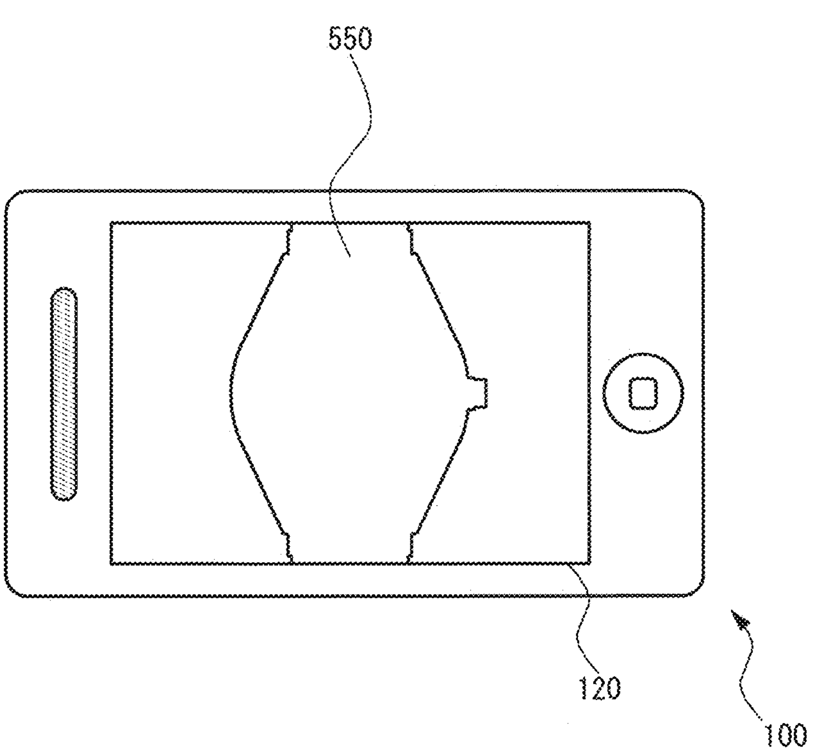
FIG. 8 is a schematic diagram for explaining an image displayed on a screen of a display portion of an information terminal in an object identification information determination process executed in an information processing system according to an embodiment of the present invention (First Embodiment).

FIGS. 7 and 8 are schematic diagrams for explaining an image displayed on the screen of the display portion 120 of the information terminal 100 in the object identification determination process executed in the information processing system 10 according to an embodiment of the present invention. An image 540 showing an illustration of a watch is displayed on the screen of the display portion 120 in FIG. 7. Further, an image 550 showing the outline of a watch, which is even more simplified than the image 540, is displayed on the screen of the display portion 120 in FIG. 8. The user can photograph the watch 500 while trying to match it with the image 540 or the image 550. Therefore, the size of the first image 510 or the second image 520 is adjusted to be constant.

Figure 9:
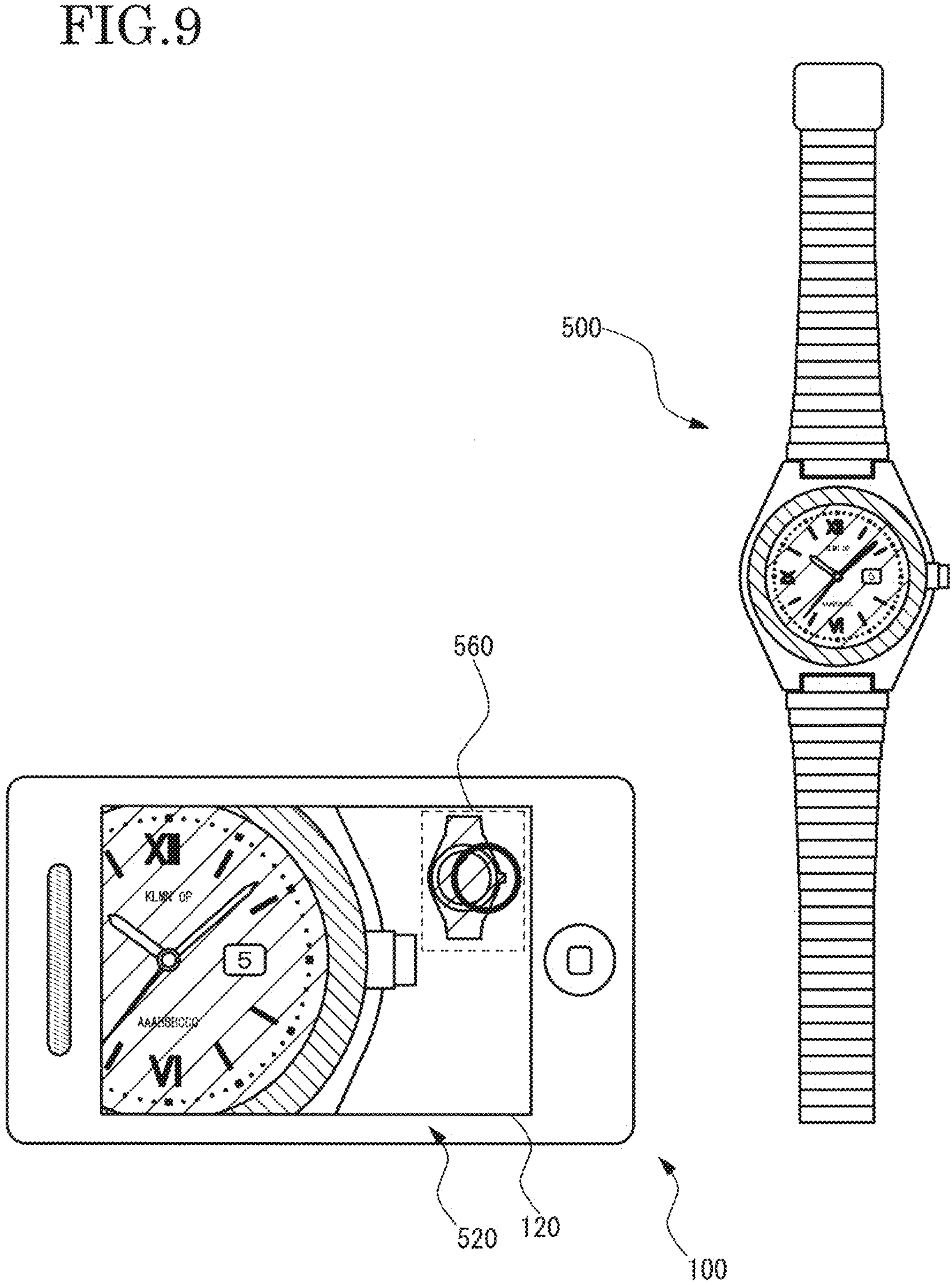
FIG. 9 is a schematic diagram for explaining a situation of a user photographing in an object identification information determination process executed in an information processing system according to an embodiment of the present invention (First Embodiment).

FIG. 9 is a schematic diagram for explaining a situation of a user photographing in the object identification determination process executed in the information processing system 10 according to an embodiment of the present invention. An image 560 showing an area to be photographed is displayed on the screen of the display portion 120 in FIG. 9. The user can photograph the watch 500 while referring to the image 560. Since the area shown in the image 560 can include characteristic parts of the watch 500, the second image 520 focusing on the characteristic parts can be generated. Further, a plurality of images 560 showing different areas may be registered in advance, and one selected image 560 from among them may be displayed on the screen of the display portion 120. In this case, the area to be photographed is different each time the object identification determination process is executed. The selection of the image 560 may be random. The above-described configuration can be applied not only to the second image 520 but also to the first image 510. In this way, the first image 510 or the second image 520 may include a part of the parts of the watch 500. Since the resolution of the area including the characteristic part is improved, the feature amount of the watch 500 extracted in the steps described later become clearer, and the accuracy of determining the object identification information based on the feature amount is improved.

Each of the first image 510 and the second image 520 may include a plurality of images. When a plurality of second images 520 are generated, a plurality of different areas of the second side 502 may be photographed using the photographing method of FIG. 9. Further, when a plurality of second images 520 are generated, the images may be generated by photographing using any one or more photographing methods of FIG. 6 to FIG. 9. For example, when the photographing method of FIG. 6 and the photographing method of FIG. 9 are used, the second images 520 including the entire dial 524 and the second image 520 focusing on the crown 528 are generated. The above-described configuration can be applied not only to the second image 520 but also to the first image 510.

In addition, when multiple first images 510 or multiple second images 520 are generated, the multiple first images 510 or the multiple second images 520 may include a so-called dummy image that is not used in determining the object identification information of the watch 500.

Although the method for photographing the first side 501 and the second side 502 of the watch 500 is described as an example, it is also possible to photograph a side other than the first side 501 and the second side 502. The first image 510 or the second image 520 may include an image of the side other than the first side 501 and the second side 502.

The steps described later may be executed for the multiple second images 520, or for one image selected from the multiple second images 520.

Returning to FIG. 5, the object identification information determination process is described again.

In step S120, the object group information acquisition section 211 extracts character strings in the first image 510 and determines whether or not the object group information is included in the first image 510. For example, the object group information acquisition section 211 extracts character strings of "ABC-10", "024A242H", "XYZ12345", "KLMN", "OP", "AAABBBCCC", "SOLAR", "JAPAN", "MOV'T", "CASED", "IN", "CHINA", "STEEL", "BACK", "WATER", "RESIST", and "5BAR" from the first image 510 (see FIG. 2). The object group information acquisition section 211 compares the extracted character strings with the object group information database 231 and acquires "ABC-10" registered in the object group information database 231 as the object group information. Therefore, when the first image 510 includes the object group information (step S120: YES), the object group information of the watch 500 is acquired, and step S130 is executed. When the first image 510 does not include the object group information (step S120: NO), step S150 is executed.

In step S130, the object feature amount generation section 212 generates the feature amount of the watch 500 from the second image 520. For example, the object feature amount generation section 212 can generate the color of the dial 524 or the bezel 527 in the second image 520, or the shape of the indexes 525 (for example, Roman numerals or Arabic numerals, etc.) as the feature amount of the watch 500 (see FIG. 3). In addition, the feature amount of the watch 500 is not limited thereto. Since the object group information is acquired in step S120, the feature amount may be generated using the object group information. For example, when the object group information and the part information (the part information includes information on the type and position of the part such as the dial 524, the bezel 527, the indexes 525, etc.) which are associated with each other are registered in the object group information database 231, the object feature amount generation section 212 can also generate the feature amount of the watch 500 based on the part information associated with the object group information. Specifically, the object feature amount generation section 212 can extract the feature amount of the part included in the part information to generate the feature amount of the watch 500.

In step S140, the object identification information acquisition section 213 determines whether or not to acquire the object identification information based on the acquired object group information and the generated feature amount. Here, acquisition of the object identification information of the watch 500 is described with reference to FIG. 10.

FIG. 10 is a schematic diagram for explaining the object identification information database 232 used in the object identification information determination process executed in the information processing system 10 according to an embodiment of the present invention. The object identification information database 232 shown in FIG. 10 is generated for each object group information, and the feature amount (such as the color of the dial 524, the color of the bezel 527, and the shape of the index 525) of the watch 500 generated in step S130 are associated with the object identification information (such as ABC-10-DE-1, ABC-10-DE-2, and ABC-10-DE-3). Therefore, the object identification information acquisition section 213 can determine and acquire the object identification information based on the feature amount of the watch 500 using the object identification information database 232. For example, the object identification information acquisition section 213 can determine that the object identification information is "ABC-10-DE-2" based on the feature amount which are the color of the dial 524, the color of the bezel 527, and the index 525 are "white", "black", and "Roman numerals", respectively.

When the object identification information of the watch 500 is determined and acquired (step S140: YES), the object identification information identification process ends. When the object identification information of the watch 500 is not determined and acquired (step S140: NO), step S150 is executed. The acquired object identification information of the watch 500 may be transmitted to the information terminal 100.

In step S150, the object identification information acquisition section 213 generates non-acquisition information indicating that the object identification information of the watch 500 cannot be acquired. When the non-acquisition information is generated, the object identification information identification process ends. The communication portion 220 may transmit the generated non-acquisition information to the information terminal 100. In this case, in the information terminal 100, the non-acquisition information received by the communication portion 130 can be displayed on the screen of the display portion 120, and that the object identification information of the watch 500 cannot be determined can be notified to the user of the information terminal 100. Thus, the user can photograph the watch 500 again.

Although the flow of the object identification information determination process (step S100) is described above, the flow of the object identification information determination process is not limited to the above-described steps. For example, when the object identification information or non-acquisition information of the watch 500 is transmitted to the information terminal 100, the degree of coincidence of the feature amount may be transmitted to the information terminal 100.

The information processing system 10 can also determine the object identification information of the object and provide the determined object identification information to the user. Therefore, the user can use the information processing system 10 to confirm the product number of the object without performing complicated tasks such as reading the instruction manual of the object. Further, user information can be collected in the information processing device 200 by connecting the information terminal 100 to the information processing device 200. For example, the information processing device 200 can collect product information purchased by the user as user information.

Therefore, the manufacturer can analyze market trends of products based on the user information.

[2-2-2. Object Information Provision Process (Step S300)]

Figure 11:
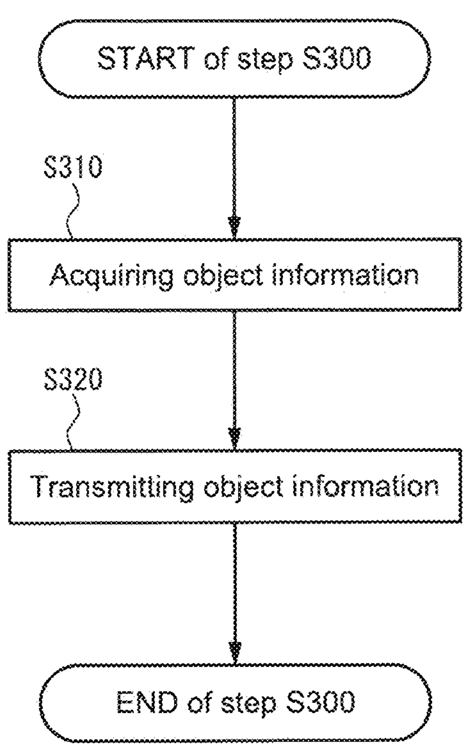
FIG. 11 is a flowchart of an object information provision process executed in an information processing system according to an embodiment of the present invention (First Embodiment).

FIG. 11 is a flowchart of the object information provision process executed in the information processing system 10 according to an embodiment of the present invention. As shown in FIG. 11, the object information provision process (step S300) includes steps S310 and S320.

In step S310, the object information acquisition section 214 acquires object information associated with the object identification information from the object information database 233. In addition, the user can also operate the information terminal 100 to request that only necessary object information is provided. In this case, the object information acquisition section 214 can acquire object information corresponding to the user request based on the user request transmitted from the information terminal 100.

In step S320, the communication portion 220 of the information processing device 200 transmits the acquired object information to the information terminal 100. Further, in the information terminal 100, the object information received by the communication portion 130 is displayed on the screen of the display portion 120. Thus, the object information is provided to the user of the information terminal 100.

When step S320 is executed, the object information provision process (step S300) ends.

Although the flow of the object information provision process (step S300) is described above, the flow of the object information provision process is not limited to the above-described steps.

When the object information provided by the information processing system 10 includes a maintenance deadline or repair parts, the user can easily confirm the maintenance deadline or the inventory of repair parts for the object owned by the user using the information processing system 10. Further, the object information provided by the information processing system 10 may include, for example, product information of the same type as the object purchased by the user, and the user can acquire product information such as new products. Furthermore, since the manufacturer can provide the information desired by the user through the information processing system 10, the user's satisfaction with the object can be improved.

[2-2-3. Object Authenticity Determination Process (Step S500)]

Figure 12:
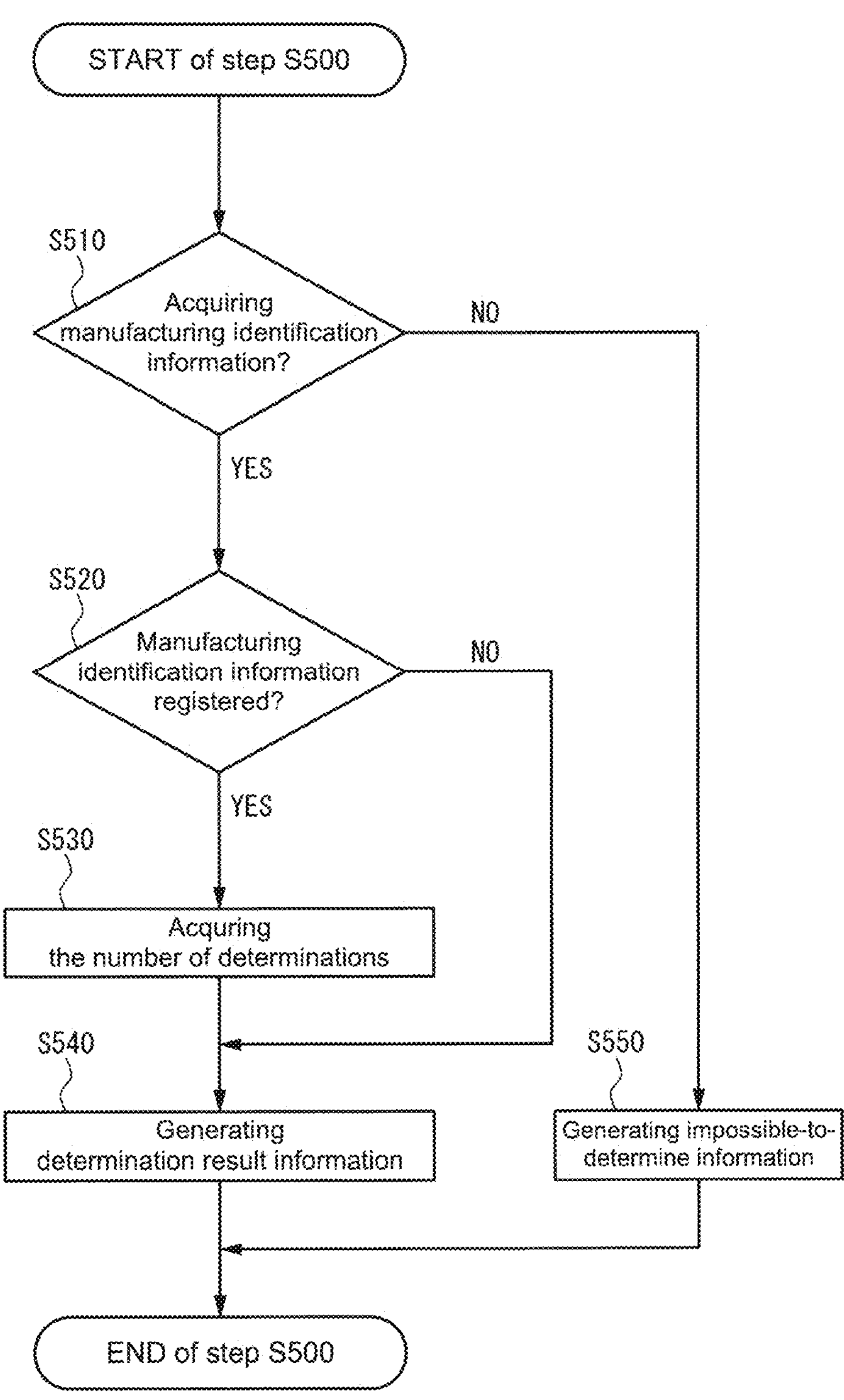
FIG. 12 is a flowchart of an object authenticity determination process executed in an information processing system according to an embodiment of the present invention (First Embodiment).

FIG. 12 is a flowchart of an object authenticity determination process executed by the information processing system 10 according to an embodiment of the present invention. As shown in FIG. 12, the object authenticity determination process (step S500) includes steps S510 to S550.

In step S510, the object authenticity determination section 215 extracts character strings in the first image 510 and determines whether or not manufacturing identification information is acquired from the extracted character strings. In step S510, the determination may be made based on the character strings extracted in step S120. Specifically, the object authenticity determination section 215 excludes predetermined character strings (exclusion character strings) registered in advance from the character strings extracted in step S120. The exclusion character strings are character strings commonly attached to objects, such as "JAPAN", "CHINA", or "WATER". Further, the object authenticity determination section 215 may exclude the character string "ABC-10", which is the object group information acquired in step S120. Through such processing, the object authenticity determination section 215 can acquire the character string "024A242H" or "XYZ12345" as the manufacturing identification information. The number of the acquired manufacturing identification information may be one or more.

In addition, the object authenticity determination section 215 may acquire a character string including pre-registered predetermined character information (a specific character information) as the manufacturing identification information. For example, the object authenticity determination section 215 may acquire a character string "XYZ12345" including the specific character information "XYZ" as the manufacturing identification information.

When the manufacturing identification information is acquired (step S510: YES), step S520 is executed. When the manufacturing identification information is not acquired (step S510: NO), step S550 is executed.

In step S520, the object authenticity determination section 215 determines whether or not the acquired manufacturing identification information is registered in the determination information database 234. When the manufacturing identification information acquired in step S510 is registered in the determination information database 234, the watch 500 to which the manufacturing identification information is attached is highly likely to be authentic. In this case, a further authenticity determination is performed in step S530, which is described later. On the other hand, when the manufacturing identification information acquired in step S510 is not registered in the determination information database 234, the watch 500 to which the manufacturing identification information is attached is determined to be a counterfeit product. When the manufacturing identification information is registered (step S520: YES), step S530 is executed. When the manufacturing identification information is not registered (step S520: NO), step S540 is executed.

In step S530, the object authenticity determination section 215 acquires the number of determinations of the manufacturing identification information acquired in step S510 from the determination information database 234. That is, the object authenticity determination section 215 executes an authenticity determination of the watch 500 based on the number of determinations. Specifically, the object authenticity determination section 215 compares the number of determinations with a threshold value. When the number of determinations is equal to or less than the threshold value, the watch 500 is determined to be authentic. When the number of determines is greater than the threshold value, the watch 500 is determined to be a counterfeit product.

In step S540, the object authenticity determination section 215 generates determination result information based on the authenticity determination executed in step S520 or step S530. Specifically, when the object authenticity determination section 215 determines that the watch 500 is a counterfeit product in step S520 or step S530, the object authenticity determination section 215 generates determination result information indicating that the watch 500 is a counterfeit product. Further, when the object authenticity determination section 215 determines that the watch 500 is an authentic product in step S530, the object authenticity determination section 215 generates determination result information indicating that the watch 500 is an authentic product. The determination result information is transmitted to the information terminal 100 via the communication portion 220.

In step S550, the object authenticity determination section 215 generates impossible-to-determine information indicating that it is not possible to determine the authenticity of the watch 500. When the manufacturing identification information is not acquired in step S510, the impossible-to-determine information is generated because it is not possible to execute an authenticity determination based on the manufacturing identification information. The impossible-to-determine information is transmitted to the information terminal 100 via the communication portion 220.

In step S540 or step S550, the information terminal 100 receives the determination result information or the impossible-to-determine information via the communication portion 130. In this case, the information terminal 100 can display the received determination result information or the received impossible-to determine information on the screen of the display portion 120. Thus, it is possible to inform the user of the information terminal 100 of the result of the authenticity determination of the watch 500 or that the authenticity determination cannot be performed. In addition, the determination result information displayed on the screen of the display portion 120 is not limited to the result of the authenticity determination. For example, when the manufacturing identification information is not registered (step S520: NO), the screen of the display portion 120 can display "This is an unregistered product" to inform the user of the information terminal 100 that the manufacturing identification information of the watch 500 is not registered. Further, when the number of determinations is greater than the threshold value in step S530, the message "Over Threshold Value. The number of determinations exceeds the specified number of times although the object is the registered product." is displayed on the screen of the display portion 120, thereby alerting the user of the information terminal 100 to the fact that the number of determinations of the watch 500 is high.

When step S540 or step S550 is executed, the object authenticity determination process (step S500) ends.

Although the flow of the object authenticity determination process (step S500) is described above, the flow of the object authenticity determination process is not limited to the above-described steps. For example, the condition for authenticity determination is not limited to the number of determinations. The condition for authenticity determination may be based on the degree of coincidence of the feature amount of the watch 500. In this case, when the degree of coincidence of the feature amount is greater than a threshold value, determination result information indicating that the watch 500 is an authentic product is generated. Further, F when user information associated with the manufacturing identification information is registered in the determination information database 234, the condition for authenticity determination may be a comparison between the user input information transmitted from the information terminal 100 and the user information in the determination information database 234. Furthermore, when the condition for authenticity determination is whether or not the manufacturing identification information is registered, step S530 is not required to be executed because step S520 is already executed. In this way, various information acquired from the watch 500 can be set as the condition for authenticity determination in the object authenticity determination process.

As described above, the information processing system 10 according to the present embodiment can determine the object identification information of the object. As a result, the information processing system 10 can provide the object information to the user or perform the authenticity determination of the object based on the determined object identification information.

The information processing system 10 according to the present embodiment is not limited to the above-described configuration, and various modifications are possible. In the following, although several modifications of the information processing system 10 according to the present embodiment are described, the description of the same configuration as the above-described configuration may be omitted.

Modification 1

Although the above-described watch 500 is a so-called analog watch, the information processing system 10 can also be applied to a digital watch.

Figure 13:
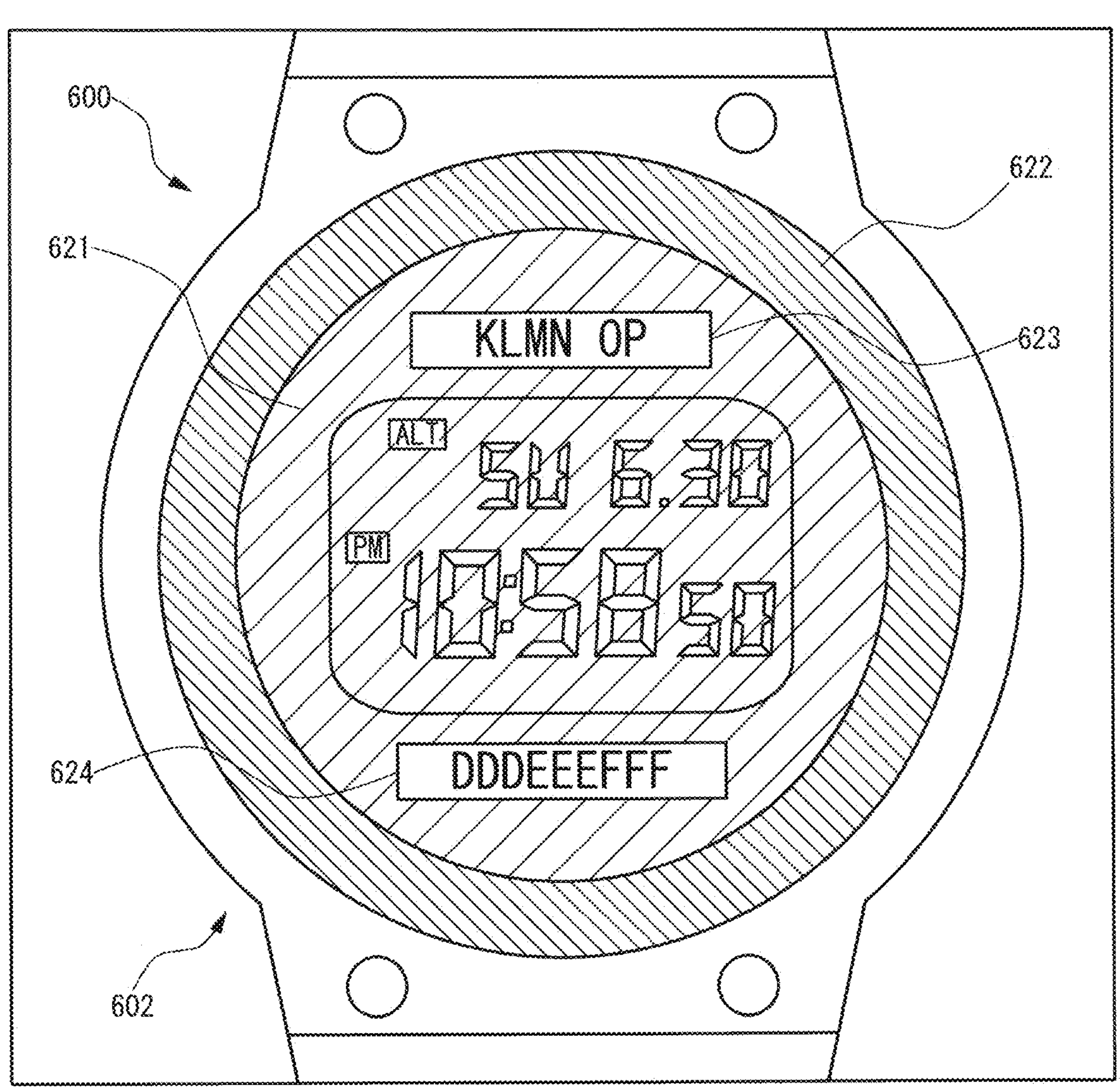
FIG. 13 is a schematic diagram of an image of a watch captured by an information processing system according to an embodiment of the present invention (First Embodiment).

FIG. 13 is a schematic diagram of an image 610 of a watch 600 captured by the information processing system 10 according to an embodiment of the present invention. Specifically, FIG. 13 is a schematic diagram of a second image 620 captured by photographing a second side 602 of the watch 600. The watch 600 is a so-called digital watch. As shown in FIG. 13, the second side 602 of the watch 600 is provided with parts such as a dial 621 and a bezel 622. Further, the first area 623 and the second area 624 of the dial 621 display character strings of the manufacturer's name "KLMN OP" and the product name "DDDEEEFFF", respectively.

In step S130 described above, the object feature amount generation section 212 can generate a feature amount of the watch 600 from the second image 620. For example, the object feature amount generation section 212 can generate the color of the dial 621 or the bezel 622 in the second image 620, or the color of the character string in the first area 623 or the second area 624 as the feature amount of the watch 600.

Therefore, in the information processing system 10, the object identification information can be determined based on the generated feature amount not only for an analog watch but also for a digital watch.

Modification 2

Another object identification information determination process executed in the information processing system 10 according to the present embodiment is described with reference to FIG. 14.

Figure 14:
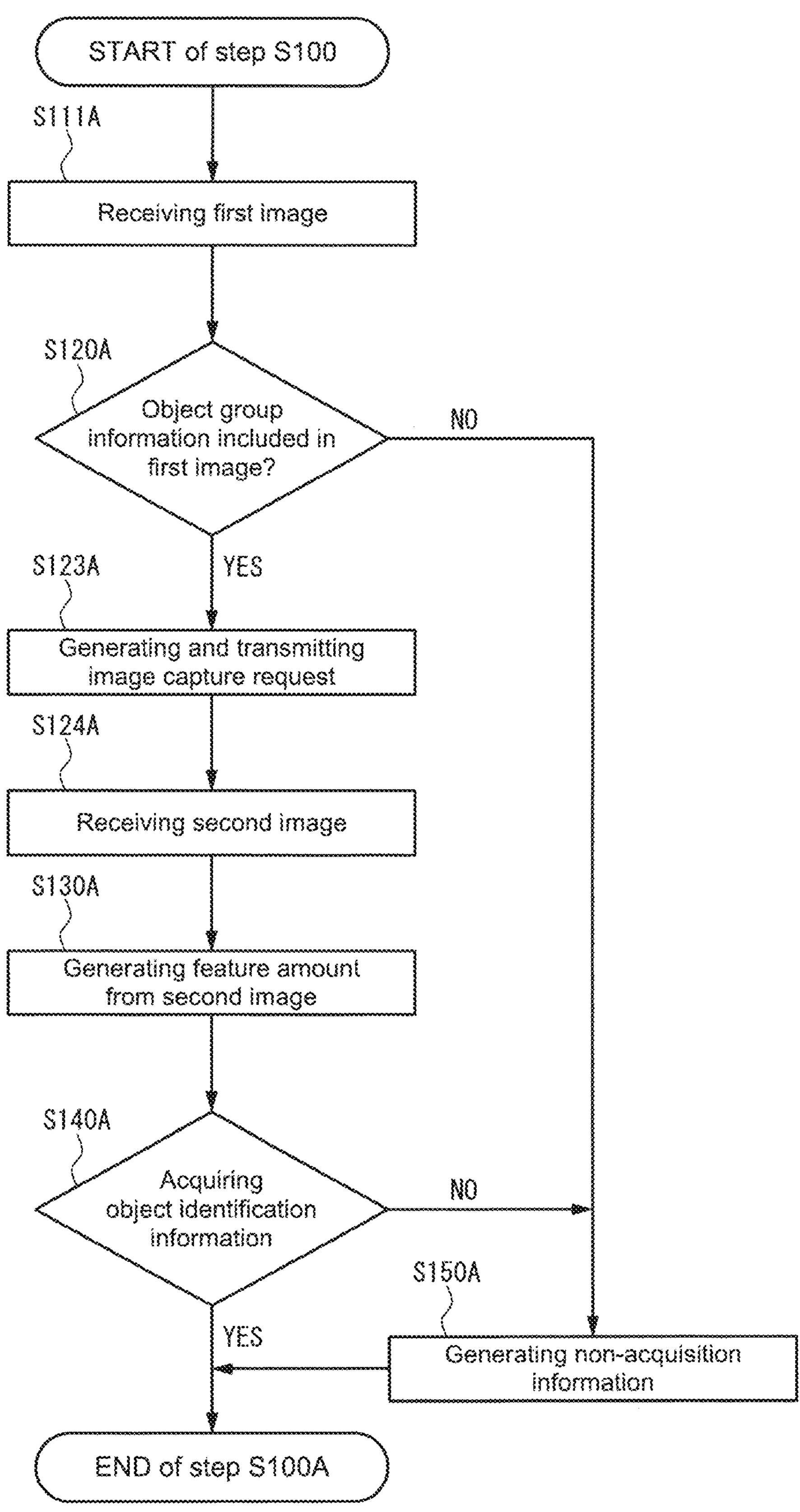
FIG. 14 is a flowchart of an object identification information determination process executed in an information processing system according to an embodiment of the present invention (First Embodiment).

FIG. 14 is a flowchart of an object identification information determination process executed in the information processing system 10 according to an embodiment of the present invention. As shown in FIG. 14, the object identification information determination process (step S100A) includes steps S111A to S150A. Although the flowchart of step S100A shown in FIG. 14 includes similar steps to the flowchart of step S100 shown in FIG. 5, steps S111A and S124A are executed in step S100A instead of step S110. Further, step S123A is executed before step S124A is executed. Therefore, steps S111A, S123A, and S124A are described in the following description.

In step S111A, the communication portion 220 of the information processing device 200 receives the first image 510 captured by the capture portion 110 of the information terminal 100. Thus, image processing of the first image 510 is executed in the information processing device 200.

In step S123A, the object group information acquisition section 211 generates an image capture request to capture an image of the second side 502 of the watch 500. The image capture request is transmitted to the information terminal 100. Therefore, the user can photograph the second side 502 of the watch 500 in response to the image capture request. Thus, a second image 520 is generated.

The image capture request may include information on guiding the user when the second side 502 of the watch 500 is photographed. For example, the image capture request may include information on explaining the part to be photographed. Specifically, when the strap of the watch 500 has characteristics, the image capture request may include an explanation for photographing to include the strap. Further, since the object group information is acquired in step S120A, the image capture request may include an explanation for photographing to include a characteristic part of the object group to which the watch 500 belongs. Furthermore, the image capture request may include an image of the outer shape of the watch 500 or an illustration of the part of the watch 500, and such an image may be displayed on the information terminal 100.

In step S124A, the communication portion 220 of the information processing device 200 receives the second image 520 captured by the capture portion 110 of the information terminal 100. Thus, it is possible to execute image processing of the second image 520 in the information processing device 200.

As described above, the first image 510 and the second image 520 are acquired in separate steps in the object identification information determination process (step S100A) executed by the information processing system 10 according to the present embodiment. When the object group information of the watch 500 is not acquired from the first image 510 (step S120A: NO), the second image 520 is not received, and image processing of the second image 520 is not executed. Therefore, the calculation load of the information processing device 200 can be reduced. Further, in step S123A, the image capture request is generated and transmitted to the information terminal 100. Since the user can photograph the second side 502 of the watch 500 according to the guidance of the image capture request, the user's convenience is improved. Furthermore, since the second image 520 including the characteristic part of the watch 500 is received, the feature amount of the characteristic part can be generated, and the object identification information of the watch 500 can be determined. Therefore, not only can the calculation load of the information processing device 200 in step S130A or step S140A be reduced, but also the determination accuracy of the object identification information in the object identification information determination process can be improved.

Modification 3

An information processing system 10A according to a modification of the present embodiment is described with reference to FIG. 15.

Figure 15:
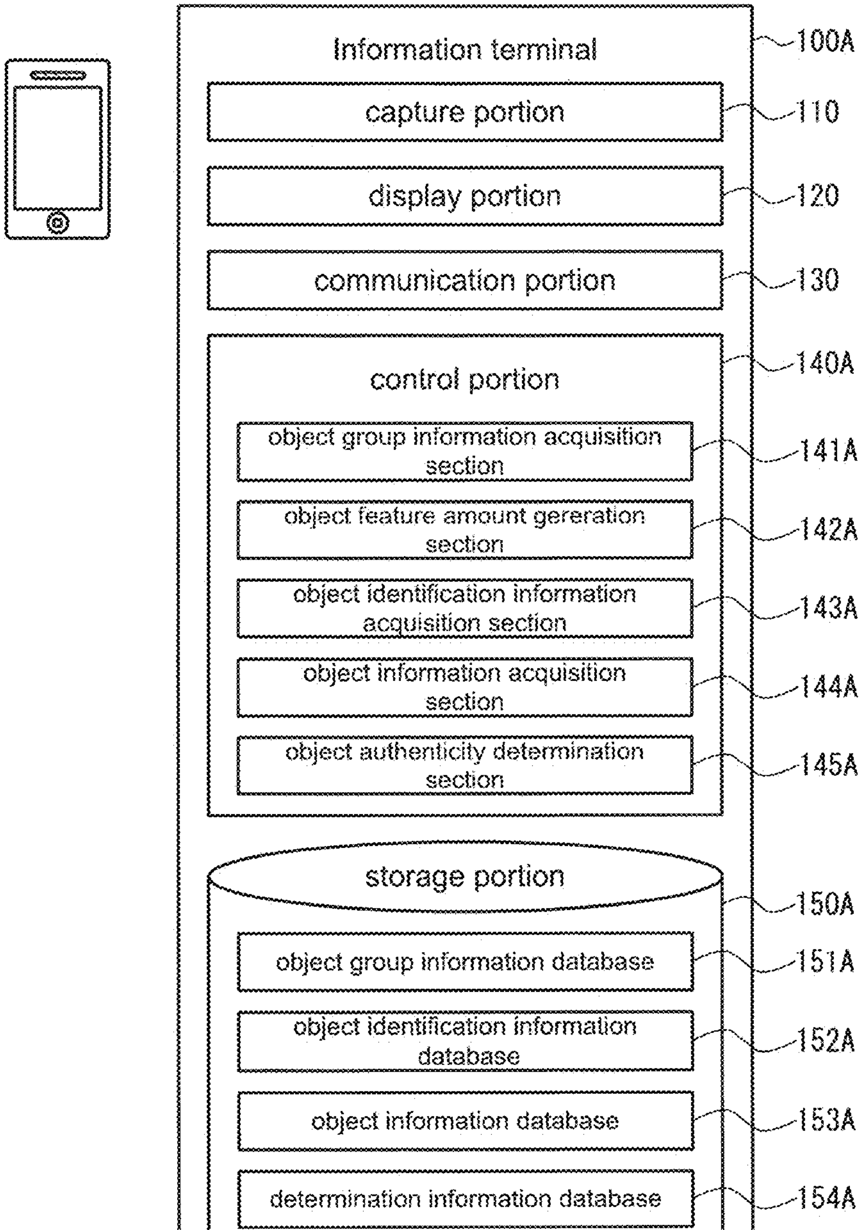
FIG. 15 is a block diagram showing a configuration of an information processing system according to an embodiment of the present invention (First Embodiment).

FIG. 15 is a block diagram showing a configuration of the information processing system 10A according to an embodiment of the present invention.

As shown in FIG. 15, the information processing system 10A includes an information terminal 100A. The information terminal 100A includes the capture portion 110, the display portion 120, the communication portion 130, a control portion 140A, and a memory portion 150A. The control portion 140A includes an object group information acquisition section 141A, an object feature amount generation section 142A, an object identification information acquisition section 143A, an object information acquisition section 144A, and an object authenticity determination section 145A. The memory portion 150A includes an object group information database 151A, an object identification information database 152A, an object information database 153A, and a determination information database 154A. The object group information acquisition section 141A, the object feature amount generation section 142A, the object identification information acquisition section 143A, the object information acquisition section 144A, the object authenticity determination section 145A, the object group information database 151A, the object identification information database 152A, the object information database 153A, and the determination information database 154A are similar to the object group information acquisition section 211, the object feature amount generation section 212, the object identification information acquisition section 213, the object information acquisition section 214, the object authenticity determination section 215, the object group information database 231, the object identification information database 232, the object information database 233, and the determination information database 234, respectively. That is, in the information processing system 10A, information processing such as the object identification information determination process, the object information provision process, and the object authenticity determination process can be executed in the information terminal 100A without being executed in the information processing device 200.

In the information processing system 10A, a program installed in the information terminal 100 may be executed, or a program stored in a recording medium (e.g., a CD-ROM or a DVD-ROM) may be read and executed.

As described above, the object identification information of an object can be determined using only the information terminal 100A in the information processing system 10A according to one modification of the present embodiment. As a result, the information processing system 10A can also provide object information to the user or perform the authenticity determination of the object based on the determined object identification information.

In addition, although the information processing system 10A can execute all information processing such as the object identification information identification process, the object information provision process, and the object authenticity determination process using the information terminal 100A, a part of the information processing may also be executed in the information processing device 200.

Second Embodiment

An information processing system 20 according to an embodiment of the present invention is described with reference to FIGS. 16 and 17. In the following, when a configuration of the information processing system 20 is similar to the configuration of the information processing system 10 of the First Embodiment, the description of the configuration of the information processing system 20 may be omitted.

[1. Configuration of Information Processing System 20]

Figure 16:
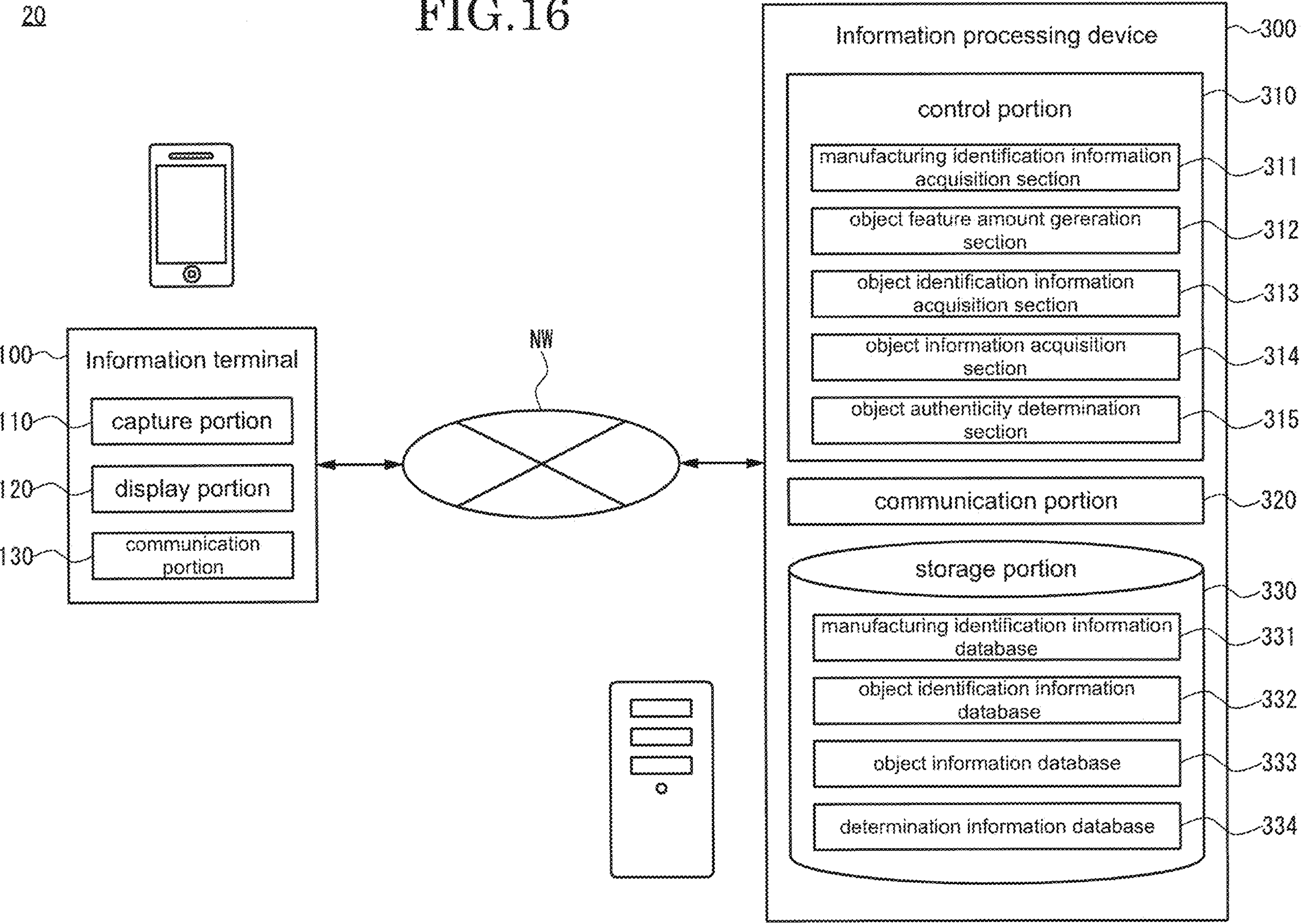
FIG. 16 is a block diagram showing a configuration of an information processing system according to an embodiment of the present invention (Second Embodiment).

FIG. 16 is a block diagram showing a configuration of the information processing system 20 according to an embodiment of the present invention.

FIG. 16, the information processing system 20 includes the information terminal 100 and an information processing device 300. The information processing device 300 includes a control portion 310, a communication portion 320, and a storage portion 330. The control portion 310 includes a manufacturing identification information acquisition section 311, an object feature amount generation section 312, an object identification information acquisition section 313, an object information acquisition section 314, and an object authenticity determination section 315. The storage portion 330 includes a manufacturing identification information database 331, an object identification information database 332, an object information database 333, and a determination information database 334. The object feature generation section 312, the object identification information acquisition section 313, the object information acquisition section 314, the object identification information database 332, the object information database 333, and the determination information database 334 are similar to the object feature generation section 212, the object identification information acquisition section 213, the object information acquisition section 214, the object identification information database 232, the object information database 233, and the determination information database 234, respectively.

The manufacturing identification information acquisition section 311 can acquire the manufacturing identification information based on the character string in the image.

The object authenticity determination section 315 can execute the authenticity determination of the object based on the acquired manufacturing identification information and generate authenticity determination information.

The manufacturing identification information database 331 is a database in which the manufacturing identification information is registered. The manufacturing identification information may be associated with the object identification information. The manufacturing identification information database 331 may be a database integrated with the determination information database 334.

[2. Object Identification Information Determination Process (Step S100B)]

Figure 17:
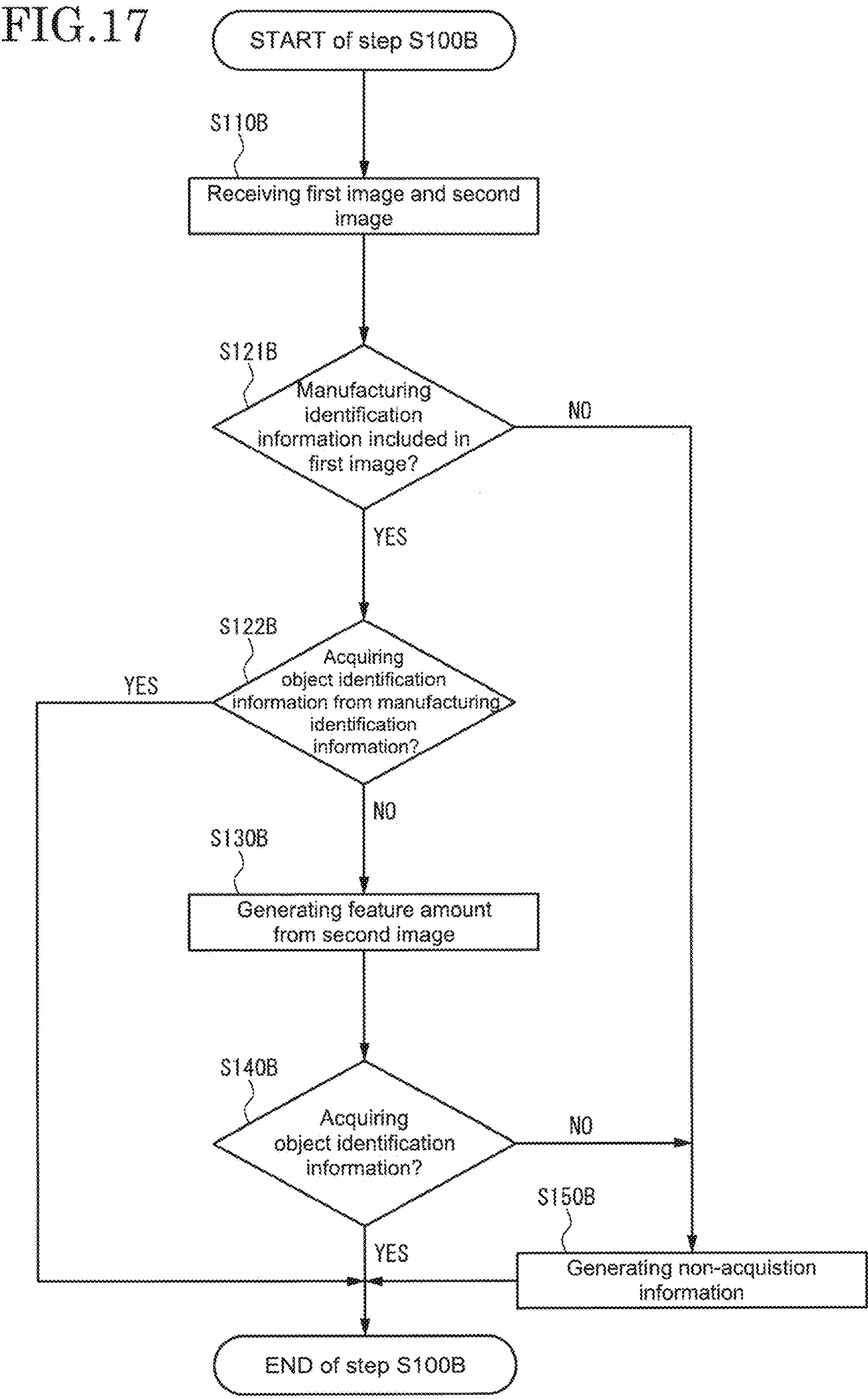
FIG. 17 is a flowchart of an object identification information determination process executed in an information processing system according to an embodiment of the present invention (Second Embodiment).

FIG. 17 is a flowchart of an object identification information determination process executed in the information processing system 20 according to an embodiment of the present invention. As shown in FIG. 17, the object identification information determination process (step S100B) includes steps S110B to S150B. Although the flowchart of step S100B shown in FIG. 17 includes similar steps to the flowchart of step S100 shown in FIG. 5, steps S121B and S122B are executed instead of step S120 in step S100B. Therefore, steps S121B and S122B are described in the following description.

In step S121B, the manufacturing identification information acquisition section 311 extracts character strings from the first image 510 and determines whether or not the first image 510 includes manufacturing identification information. The manufacturing identification information acquisition section 311 compares the extracted character strings with the manufacturing identification information database 331, and acquires the serial number "024A0242H" or the random number "XYZ12345" registered in the manufacturing identification information database 331 as the manufacturing identification information. Therefore, when the first image 510 includes the manufacturing identification information (step S121B: YES), the manufacturing identification information of the watch 500 is acquired and step S122B is executed. When the first image 510 does not include the manufacturing identification information (step S121B: NO), step S150B is executed.

In step S122B, the object identification information acquisition section 313 determines whether or not object identification information can be acquired based on the acquired manufacturing identification information. Specifically, the object identification information acquisition section 313 compares the acquired manufacturing identification information with the manufacturing identification information database 331, and acquires object identification information associated with the manufacturing identification information. Therefore, when the object identification information is acquired from the manufacturing identification information (step S122B: YES), the object identification determination process (step S100B) ends. When the object identification information is not acquired from the manufacturing identification information (step S122B: NO), step S130B is executed.

Although the object identification information determination process executed in the information processing system 20 is described, the object information provision process and the object authenticity determination process executed in the information processing system 20 are substantially similar to the object information provision process (step S300) and the object authenticity determination process (step S500) executed by the information processing system 10. In the information processing system 20, since the manufacturing identification information is acquired in step S100A, it is not necessary to acquire the manufacturing identification information in the object information provision process and the object authenticity determination process.

As described above, the information processing system 20 according to the present embodiment can determine the object identification information of the object. As a result, the information processing system 20 can provide the object information to the user or perform the authenticity determination of the object based on the identified object identification information.

Modification 1

Another object identification information determination process executed by the information processing system 20 according to the present embodiment is described with reference to FIG. 18.

Figure 18:
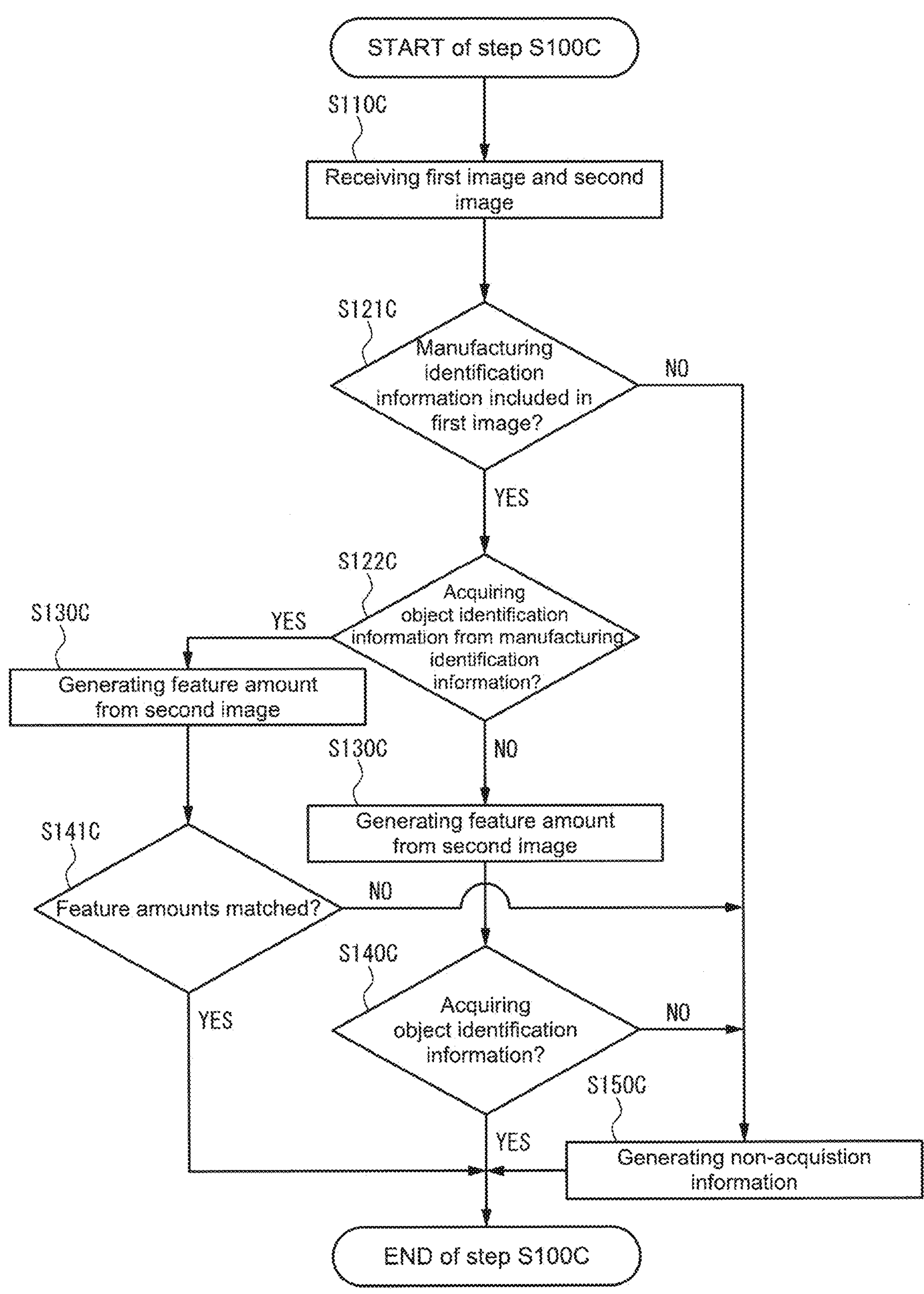
FIG. 18 is a flowchart of an object identification information determination process executed in an information processing system according to an embodiment of the present invention (Second Embodiment).

FIG. 18 is a flowchart of an object identification information determination process executed in the information processing system 20 according to an embodiment of the present invention. As shown in FIG. 18, the object identification information determination process (step S100C) includes steps S110C to S150C. Although the flowchart of step S100C shown in FIG. 18 includes similar steps to the flowchart of step S100B shown in FIG. 17, in step S100C, when object identification information is acquired from manufacturing identification information (step S122C: YES), steps S130C and S141C are executed. Since step S130C is the same as step S130B, step S141C is described in the following description.

In step S141C, the object identification information acquisition section 313 determines whether or not the feature amount acquired from the object identification information acquired in step S122C (the feature amount registered in the object identification information database) matches the feature amount generated in step S130C. When the two feature amounts match each other (step S141C: YES), the object identification information identification process ends. When the two feature amounts do not match each other (step S141C: NO), step S150C is executed.

As described above, in the object identification information identification process (step S100C) executed in the information processing system 20 according to the present embodiment, when object identification information is acquired from the manufacturing identification information (step S122C: YES), a feature amount of the watch 500 is generated from the second image 520, and a match of the feature amount is determined. Even when object identification information is acquired from the manufacturing identification information, a watch from a different object group may be a counterfeit product to which duplicated manufacturing identification information is attached. Even in such a case, it is possible to prevent acquisition of manufacturing identification information from a counterfeit product by executing steps S130C and S141C. Therefore, it is possible to improve the accuracy of determining the object identification information in the object identification process.

Modification 2

Another object identification information determination process executed in the information processing system 20 according to the present embodiment is described with reference to FIG. 19.

Figure 19:
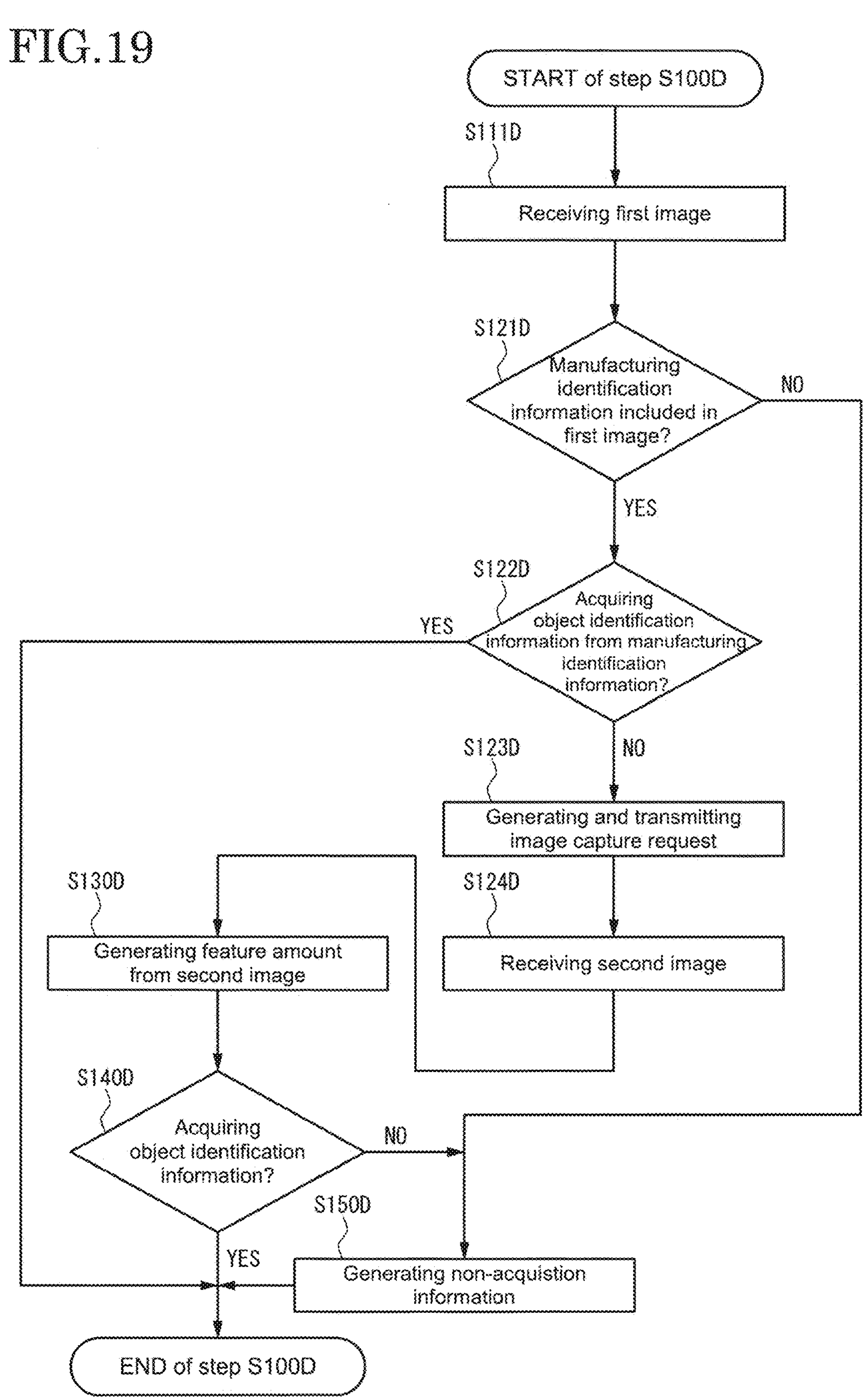
FIG. 19 is a flowchart of an object identification information determination process executed in an information processing system according to an embodiment of the present invention (Second Embodiment).

FIG. 19 is a flowchart of an object identification information identification process executed in the information processing system 20 according to an embodiment of the present invention. As shown in FIG. 19, the object identification information determination process (step S100D) includes steps S111D to S150D. Although the flowchart of step S100D shown in FIG. 19 includes similar steps to the flowchart of step S100B shown in FIG. 17, steps S111D and S124D are executed instead of step S110B in step S100D. Further, step S123D is executed before step S124D is executed.

In addition, since steps S111D, S123D, and S124D are similar to steps S111A, S123A, and S124A of step S100A shown in FIG. 14, respectively, descriptions of steps S111D, S123D, and S124D are omitted.

As described above, in the object identification information determination process (step S100D) executed in the information processing system 20 according to the present embodiment, the first image 510 and the second image 520 are acquired in separate steps. When the object identification information is not acquired from the manufacturing identification information (step S122D: NO), the second image 520 is not received, and the image processing of the second image 520 is not executed. Therefore, the calculation load of the information processing device 300 can be reduced. Further, in step S123D, the image capture request is generated and transmitted to the information terminal 100. Since the user can photograph the second side 502 of the watch 500 according to the guidance of the image capture request, the user's convenience is improved. Furthermore, since the second image 520 including the characteristic part of the watch 500 is received, the feature amount of the characteristic part can be generated, and the object identification information of the watch 500 can be determined. Therefore, not only can the calculation load of the information processing device 300 in step S130D or step S140D be reduced, but also the determination accuracy of the object identification information in the object identification information determination process can be improved.

Third Embodiment

An information processing system 30 according to an embodiment of the present invention is described with reference to FIGS. 20 and 21. In the following, when a configuration of the information processing system 30 is similar to the configuration of the information processing system 10 of the First Embodiment, the description of the configuration of the information processing system 30 may be omitted.

[1. Configuration of Information Processing System 30]

FIG. 20 is a block diagram showing a configuration of the information processing system 30 according to an embodiment of the present invention.

As shown in FIG. 20, the information processing system 30 includes the information terminal 100 and an information processing device 400. The information processing device 400 includes a control portion 410, a communication portion 420, and a storage portion 430. The control portion 410 includes a candidate information generation section 411, an object identification information acquisition section 412, an object information acquisition section 413, and an object authenticity determination section 414. The storage portion 430 includes a candidate information learning model 431, an object information database 432, and a determination information database 433. The object information acquisition section 413, the object information database 432, and the determination information database 433 are similar to the object information acquisition section 214, the object information database 233, and the determination information database 234, respectively.

The candidate information generation section 411 can generate a feature amount of an object from an image and generate one or more candidate object identification information (candidate information) by applying the generated feature amount to the candidate information learning model 431.

The object identification information acquisition section 412 can acquire object identification information based on the candidate information and user input information.

The object authenticity determination section 414 can provide location information of the manufacturing identification information attached to the object. Further, the object authenticity determination section 414 can receive user input information or an image via the communication portion 420 and determine whether or not the manufacturing identification information is acquired based on the user input information or the image.

The candidate information learning model 431 is a model trained by machine learning such as a neural network or deep learning, so that candidate object identification information is output when the feature amount of an object is input.

[2. Object Identification Information Determination Process (Step S100E)]

Figure 21:
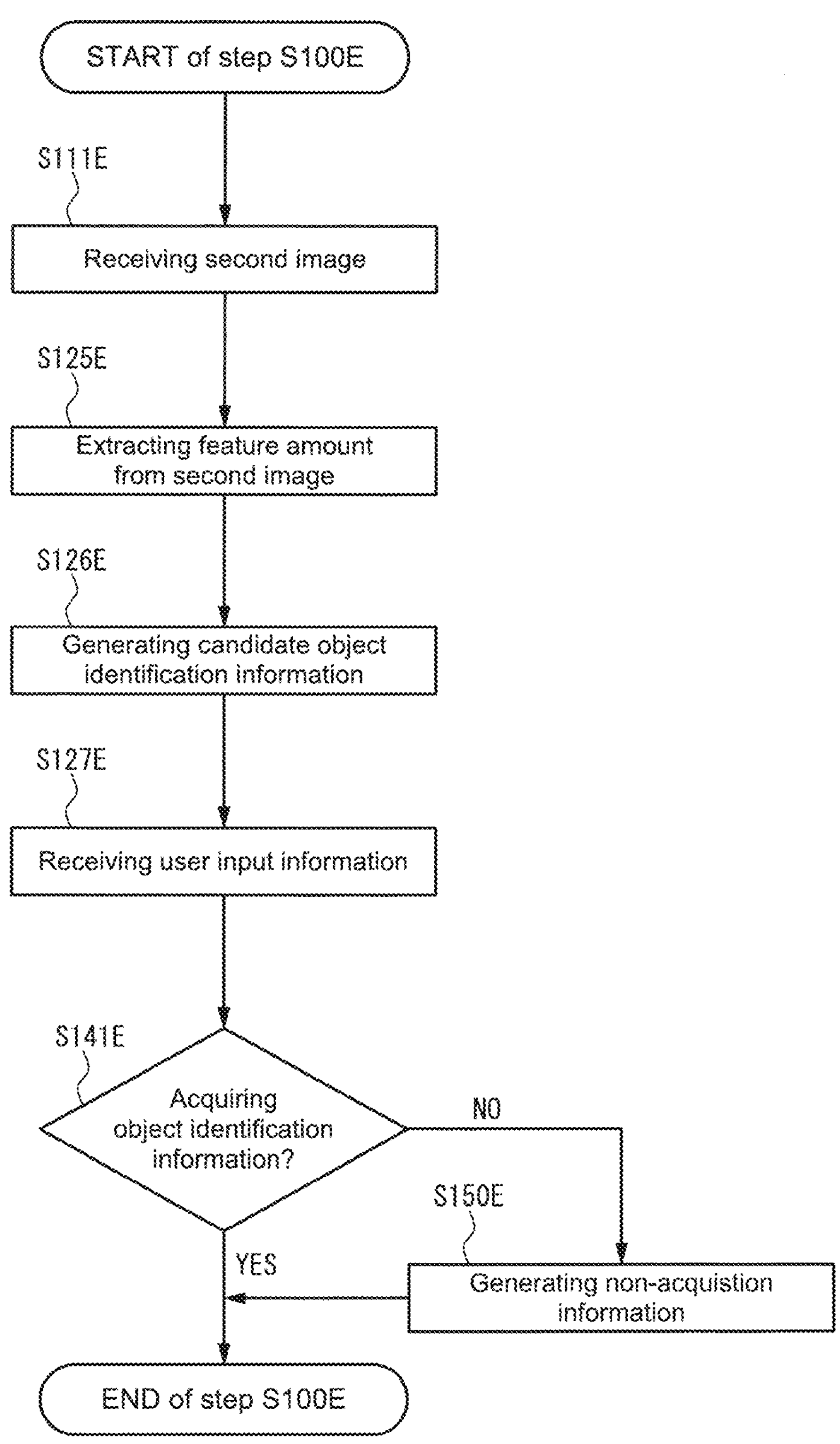
FIG. 21 is a flowchart of an object identification information determination process executed in an information processing system according to an embodiment of the present invention (Third Embodiment).

FIG. 21 is a flowchart of an object identification information determination process executed in the information processing system 30 according to an embodiment of the present invention. As shown in FIG. 21, the object identification information determination process (step S100E) includes steps S111E to S150E. Although the flowchart of step S100E shown in FIG. 21 includes the similar steps to the flowchart shown in FIG. 5, step S111E instead of step S110, steps S125E, S126E and S127E instead of steps S120 and S130, step 141E instead of step S140 are executed in step S100E. Therefore, steps S111E, S125E, S126E, S127E, and S141E are described in the following description.

In step S111E, the communication portion 420 of the information processing device 400 receives the second image 520 captured by the capture portion 110 of the information terminal 100. That is, the first image 510 is not required to be captured in the object identification information identification process (step S100E) executed in the information processing system 30.

In step S125E, the candidate information generating section 411 extracts the feature amount of watch 500 from the second image 520.

In step S126E, the candidate information generation section 411 applies the extracted feature amount to the candidate information learning model 431 to generate one or more candidate information. That is, the candidate information is generated from the second image 520 in steps S125E and S126E. The generated candidate information is transmitted to the information terminal 100 via the communication portion 420.

In the information terminal 100, the candidate information is displayed on the screen of the display portion 120 in a state in which user input is possible. Therefore, the user can select one object identification information from the displayed candidate information, or input that the watch 500 is not included in the candidate information. The user input information input by the user is transmitted to the information processing device 400 via the communication portion 130. In addition, the candidate information displayed on the screen of the display portion 120 preferably displays an image of a watch corresponding to the candidate information. When the image is displayed, the user can visually compare the image of the watch displayed on the screen of the display portion 120 with the actual watch 500.

The candidate information generated in step S126 may be transmitted to the information terminal 100 along with the degree of coincidence of the feature amount. In this case, the degree of coincidence of the feature amount can also be displayed on the screen of the display portion 120, and may be an index for the user to select the object identification information from the candidate information.

In step S127E, the communication portion 420 of the information processing device 400 receives the user input information.

In step S141E, the object identification information acquisition section 412 determines whether or not object identification information can be acquired based on the candidate information and the user input information. The user input information includes one object identification information selected from the candidate information or information in which the object identification information of the watch 500 is not included in the candidate information. Therefore, the object identification information acquisition section 412 can acquire the object identification information of the watch 500 based on the user input information. When the object identification information of the watch 500 is acquired (step S141E: YES), the object identification information determination process ends. When the object identification information of the watch 500 is not acquired (step S141E: NO), step S150E is executed.

In addition, when the object identification information of the watch 500 is not acquired in step S141E, other candidate information may be displayed on the screen of the display portion 120. Further, regardless of the candidate information, a list of objects may be displayed on the screen of the display portion 120. Thus, the user can select object identification information based on the other candidate information or the list of objects.

Although the object identification information determination process executed in the information processing system 30 is explained, the object information provision process executed in the information processing system 30 is similar to the object information provision processing executed in the information processing system 10 (step S300).

[3. Object Authenticity Determination Process (Step S500B)]

Figure 22:
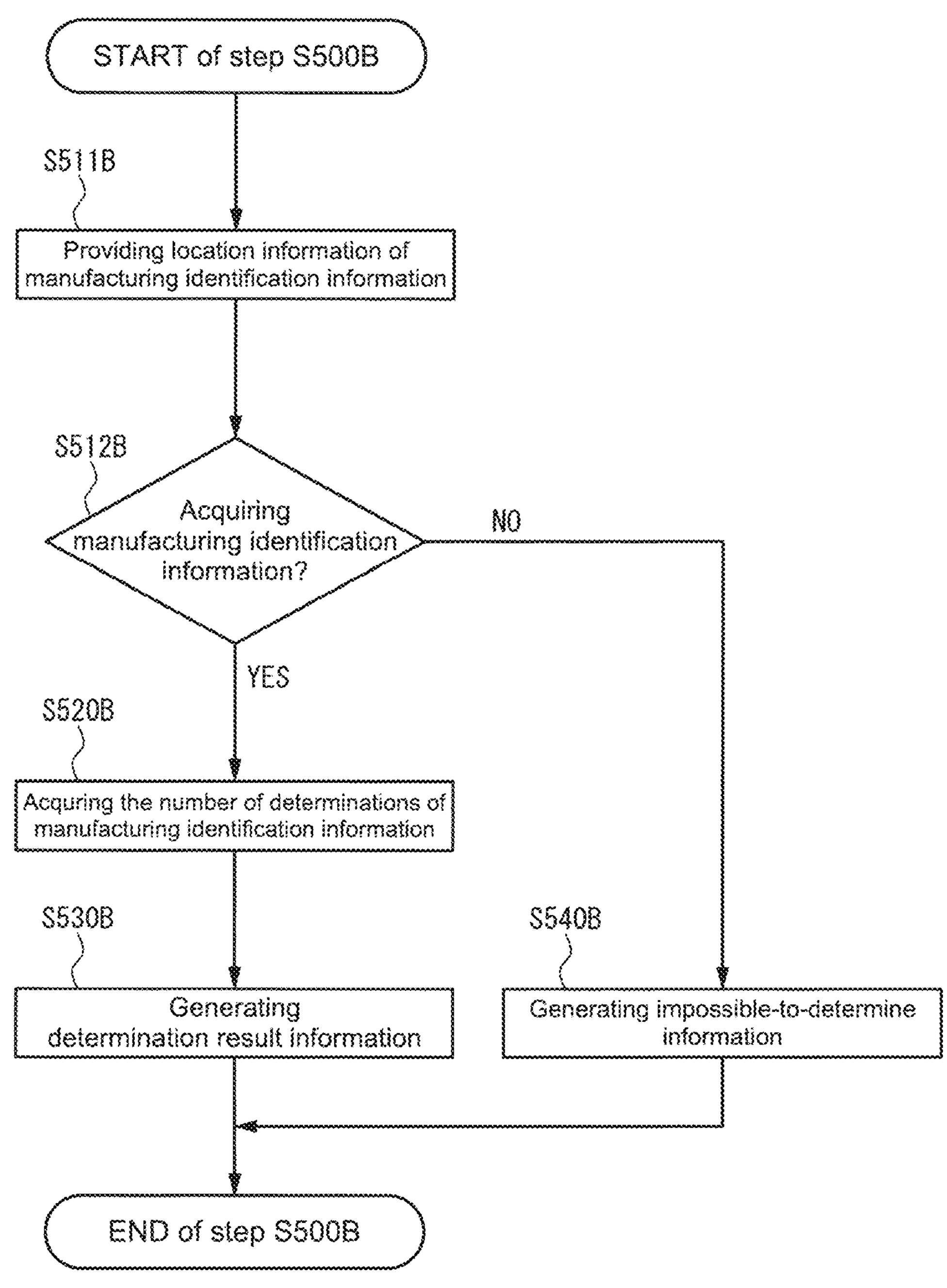
FIG. 22 is a flowchart of an authenticity determination process executed in an information processing system according to an embodiment of the present invention (Third Embodiment).

FIG. 22 is a flowchart of an authenticity determination process executed in the information processing system 30 according to an embodiment of the present invention. As shown in FIG. 22, the object identification information determination process (step S500B) includes steps S511B to S540B. In step S500B, steps S511B and S512B are executed instead of step S510 in step S500. Therefore, steps S511B and S512B are described in the following description.

In step S511B, the object authenticity determination section 414 acquires the location information of the manufacturing identification information attached to the watch 500. The location information of the manufacturing identification information is included in the object information database 432 and is associated with the object identification information. Therefore, the object authenticity determination section 414 can acquire the location information of the manufacturing identification information based on the object identification information acquired in step S100B. The acquired location information is transmitted to the information terminal 100 via the communication portion 420.

In the information terminal 100, the location information is displayed on the screen of the display portion 120 so that the user input can be input. Therefore, the user can recognize the manufacturing identification information attached to the watch 500 based on the location information and input the manufacturing identification information. The user input information input by the user is transmitted to the information processing device 400 via the communication portion 130.

In addition, the information terminal 100 may be capable of capturing an image while displaying the location information on the screen of the display portion 120. In this case, the first image 510 is transmitted to the information processing device 400 via the communication portion 130 instead of the user input information.

In step S512B, the object authenticity determination section 414 determines whether or not the object identification information can be acquired based on the user input information or the first image 510. Since the user input information includes the object identification information, the object authenticity determination section 414 can acquire the object identification information. Further, even when the first image 510 is used, the object identification information can be acquired in the same manner as in step S510. When the object identification information is acquired (step S512B: YES), step S520B is executed. When the object identification information is not acquired (step S512B: NO), step S540B is executed.

As described above, the information processing system 30 according to the present embodiment can determine the object identification information of the object. As a result, the information processing system 30 can provide the object information to the user or perform the authenticity determination of the object based on the identified object identification information.

Each of the embodiments described above as an embodiment of the present invention can be appropriately combined and implemented as long as they do not contradict each other. Further, additions, deletion, or design changes of constituent elements based on the respective embodiments are also included within the scope of the present invention as long as the gist of the present invention is provided.

Other effects of the action which differ from those brought about by each of the embodiments described above but which are apparent from the description herein or which can be readily predicted by those skilled in the art, are naturally understood to be brought about by the present invention.

What is claimed is:

1. An information processing system comprising:

a processor; and a memory storing instructions that, when executed by the processor, cause the processor to implement;

an image processing section executing:

performing image processing of a first image and a second image, wherein the first image is of a first side of a watch including object group information assigned to the watch for classifying the watch, the second image is of a second side of the watch displaying a time indicated by the watch, and the image processing includes correcting at least one of a resolution, a size, or an orientation of the first image and the second image, wherein during the correcting, at least one of parts of the watch, an overlapping position of two hands of the watch, a center position of a dial of the watch, a time displayed by the watch, a logo, or a character is detected, and the correcting is performed based on the detection;

an object group information acquisition section executing:

extracting a character string from the first image;

comparing the extracted character string with a first database in which object group information is registered in advance; and acquiring the character string as the object group information when the extracted character string includes the object group information registered in the first database;

an object feature generation section executing:

generating a feature amount of the watch from the second image; and an object identification information acquisition section executing:

comparing the generated feature amount with a second database in which a feature amount of the watch and object identification information for identifying a type of the watch each associated with the object group information are registered in advance; and acquiring the object identification information when the generated feature amount of the watch matches the feature amount registered in the second database.

2. The information processing system according to claim 1, further comprising an object authenticity determination section executing:

acquiring manufacturing identification information assigned to the watch for identifying an individual watch at a time of manufacturing the individual watch from the first image;

comparing the manufacturing identification information with a third database in which a number of authenticity determinations associated with manufacturing identification information of the watch is registered; and determining that the watch is an authentic product when the acquired manufacturing identification information is registered in the third database and the number of authenticity determinations is less than or equal to a threshold value.

3. The information processing system according to claim 2, further comprising an object authenticity determination section executing;

determining that the watch is an authentic product when a degree of coincidence between the generated feature amount of the watch and the feature amount registered in the second database is greater than a threshold value.

4. The information processing system according to claim 1, wherein the second image includes at least one part of the watch included in an area indicated when capturing the second side, and wherein the generated feature amount of the watch is a feature amount of the at least one part of the watch.

5. The information processing system according to claim 1, further comprising an object information acquisition section executing;

acquiring a maintenance deadline or part inventory information of the watch from an object information database in which the maintenance deadline or the part inventory information of the watch associated with the object identification information is registered in advance.

6. The information processing system according to claim 1, further comprising an object information acquisition section executing;

acquiring product information from an object information database in which the product information of a same type as the watch associated with the object identification information is registered in advance.

* * * * *